INVENTOR.
W.G. PETTITT
BY Forest B. Hitchcock
HIS ATTORNEY

CODE COMMUNICATION SYSTEM

Filed Oct. 2, 1961 12 Sheets-Sheet 4

INVENTOR.
W.G. PETTITT

BY Forest B. Hitchcock [signature]

HIS ATTORNEY

INVENTOR.
W.G.PETTITT
BY Forest B. Hitchcock
HIS ATTORNEY

INVENTOR.
W.G.PETTITT
BY
Forest W. Whitehead
HIS ATTORNEY

INVENTOR.
W.G.PETTITT
BY
Forest B. Whitehead
HIS ATTORNEY

Aug. 23, 1966 W. G. PETTITT 3,268,862

CODE COMMUNICATION SYSTEM

Filed Oct. 2, 1961 12 Sheets-Sheet 8

TRANSMITTER WAVEFORMS

INVENTOR.
W. G. PETTITT
BY Forest B. Hitchcock
HIS ATTORNEY

INVENTOR.
W.G.PETTITT
BY
HIS ATTORNEY

INVENTOR.
W.G.PETTITT
BY Forest B. Hitchcock
HIS ATTORNEY

INVENTOR.
W. G. PETTITT
BY Forest B. Hitchcock
HIS ATTORNEY

INVENTOR.
W. G. PETTITT
BY Forest B. Hitchcock
HIS ATTORNEY

United States Patent Office 3,268,862

Patented August 23, 1966

3,268,862

CODE COMMUNICATION SYSTEM

Walter G. Pettitt, Rochester, N.Y., assignor to General Signal Corporation, a corporation of New York Filed Oct. 2, 1961, Ser. No. 142,372
15 Claims. (Cl. 340—22)

The present invention relates to a communication system, and more particularly to an improved communication system for transmitting and receiving information to and from a moving vehicle and a fixed location.

In the remote supervision or control of moving vehicles, such as railway trains, for example, it is necessary for the control center to receive certain information about each train and/or for each train to receive various commands from the control center as the train progresses along its route. The information transmitted from the train to the control center may include the identity of the train, the speed that it is traveling, whether it is accelerating or decelerating, or whether it is in a power or braking condition, for example. When controlling the operation of the train, the information transmitted to the train may include commands to proceed at a certain speed, reverse direction, stop, etc. In systems where the communication is required to occur at definite fixed locations along the route, there are definite advantages in providing a wayside device, which cooperates with an element on the moving train to cause the transmission and reception of information as the train passes the wayside device.

Heretofore, the transfer of information by the cooperation of a train carried device and a wayside device was effected through induction, using an inert wayside coil and a train carried device or coils that were tuned to a distinctive frequency, for selectively operating train carried apparatus. Although the use of cooperating coils is reliable, a separate set of wayside and train carried coils is needed for each kind of information transmitted and received. Therefore, these prior systems were usually confined in their application to the transmission and reception of a single kind of information, such as train identity or train location. In systems where it became necessary to transmit a plurality of information in the form of a code to and from a moving train, radio transmitters and receivers were employed that used a separate frequency for each individual location or train.

The purpose of the present invention is to provide a system for transmitting and receiving a plurality of information to and from a moving train and a wayside location which does not require separate frequencies for each train or location. In furtherance thereof, One of the objects of the present invention is to provide an improved system for the communication of information between a moving train and a wayside location.

Another object of this invention is to provide an improved communication system which will transmit and receive a plurality of information to and from the train at at fixed wayside location wherein it is necessary to use only one train-carried element which cooperates with a single fixed device along the wayside.

Another object of this invention is to provide an improved communication system which effectively transmits and receives a plurality of information as the train is traveling at high speed past the location from or to which the information is transmitted or received.

Another object of this invention is to provide an improved communication system which causes the effective transmission and reception of a plurality of information signals in serial form while the train-carried and wayside devices are in cooperative relationship as the train passes the wayside device.

A further object of this invention is to provide an improved communcation system of the character described which is effective to substantially cancel any extraneous noise in the circuit during the effective transmission and reception of the information.

A further object of this invention is to provide an improved system for communicating between a moving object and a fixed location whereby a series of coded signals are transmitted serially in rapid succession.

A still further object of this invention is to provide an improved communication system wherein a cycle of code pulses are received in quick succession and are read out of the receiving apparatus at the end of the cycle.

A still further object of this invention is to provide an improved communication system for transmitting and receiving a code cycle wherein the receiver rejects an incomplete code cycle or an improper code cycle.

A still further object of this invention is to provide an improved system for communicating between a train moving at high speed and a fixed wayside location which is reliable in its operation, simple in its installation, and relatively inexpensive to manufacture.

Other objects of this invention will become apparent from the specification, the drawings, and the appended claims.

In the drawings:

FIGS. 1A and 1B when placed one above the other illustrate schematically the circuitry of the transmitting apparatus according to one embodiment of the invention.

FIGS. 2A, 2B, 2C, 2D, and 2E when arranged according to FIG. 5 illustrate schematically the circuitry for the receiving portion of the system according to this embodiment of the invention;

Generally speaking and without intending to limit the scope of the present invention, the illustrated embodiment is comprised of a transmitter which has a loop antenna, and a receiver which also has a loop antenna. If the information is to be transmitted from the train to the wayside, the transmitter is located on the locomotive with its loop antenna positioned on the locomotive so that it passes in close proximity to the receiver antenna, which is positioned at a fixed location along the wayside, as the train passes this fixed location. The receiver is effective to be influenced by the signals from the transmitter only when their respective antennas are in close proximity to each other. The transmitting portion of the system according to the present invention is so constituted to transmit a complete code cycle, that is comprised of a plurality of digits, during the short time that the two antennas are in close proximity, while the train is traveling at high speed. The receiving portion of the system is so constituted according to the present invention that it receives effectively, this code cycle of serial digits during this same short time. At the end of each received cycle the information may be transferred to suitable control or indication apparatus.

Each code cycle is comprised of a series of short pulses of equal length, each of which is either a high frequency pulse period followed by a center frequency pulse period, or a low frequency pulse period followed by a center frequency pulse period. In the illustrated embodiment each code cycle is commenced by the transmission and reception of a high frequency pulse period; and a long center frequency pulse period is transmitted and received between each code cycle.

The receiving portion of the system is also arranged so that any extraneous noises are cancelled out effectively. Also in the event that a high or low frequency pulse of a cycle is not received, or is not transmitted, this is detected by the receiver as being the end of the cycle, and because a complete cycle of the proper number of pulses has not been received, the command or information is not executed or indicated.

Figure 1A:
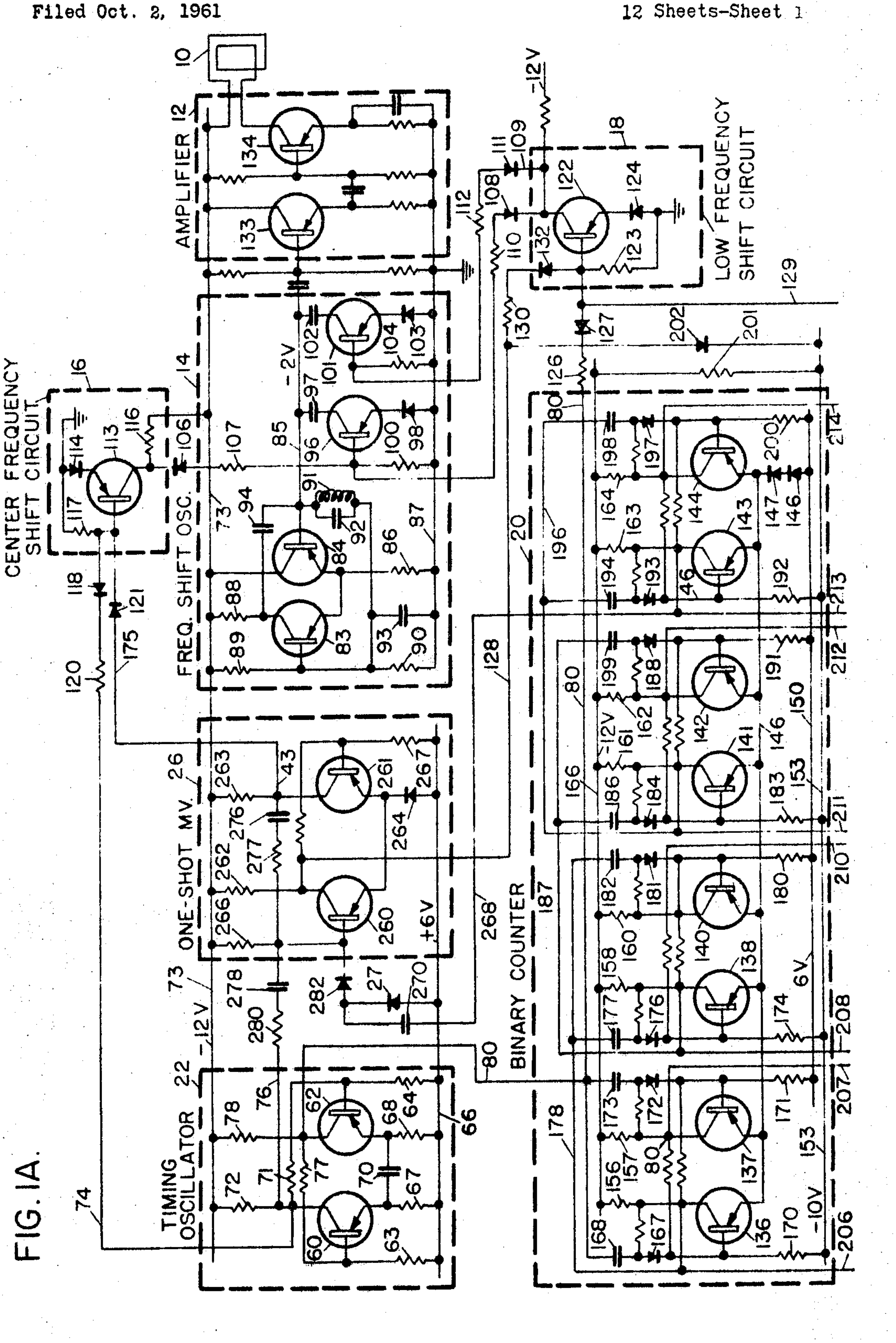
Figure 1B:
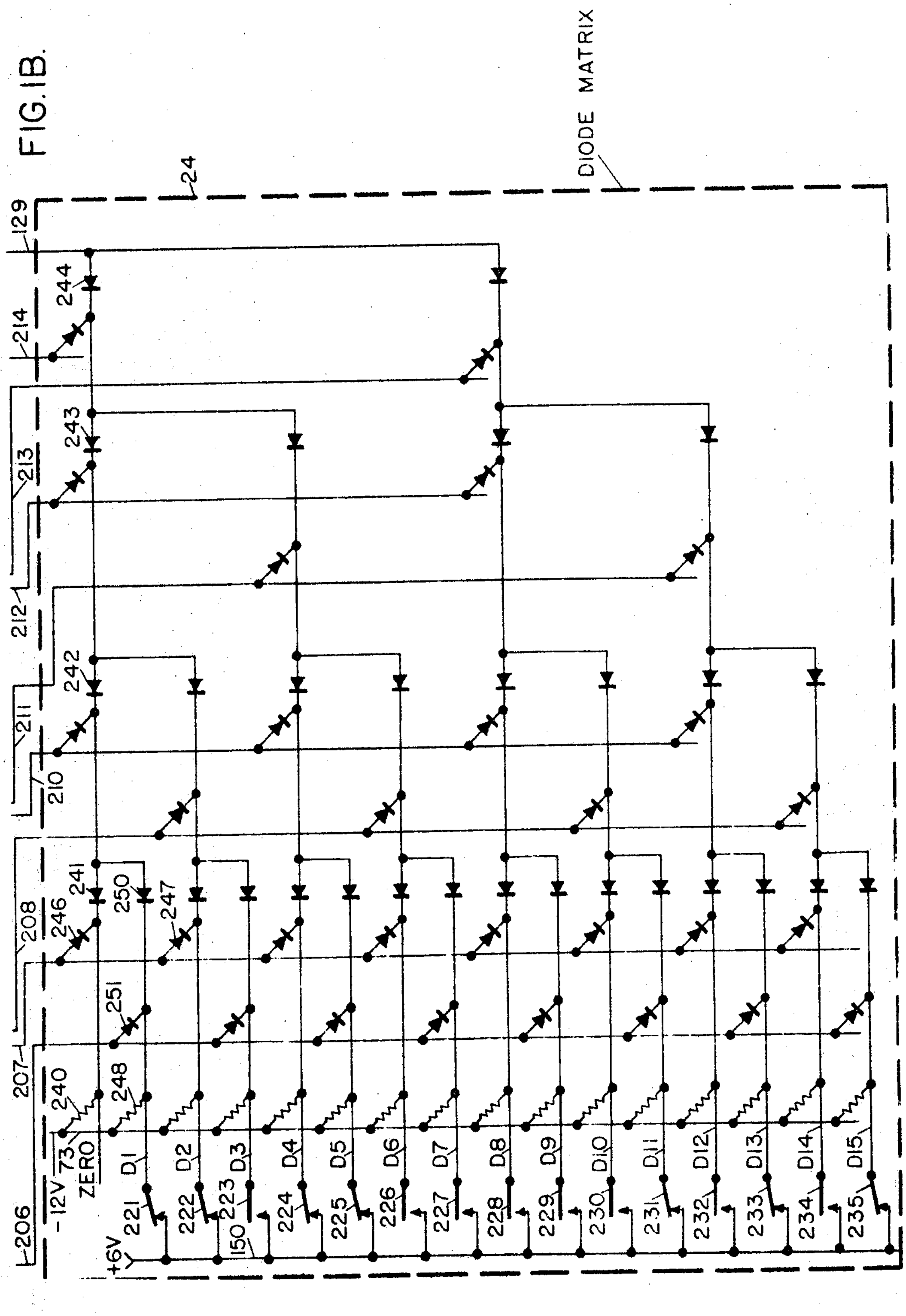
Figure 5:
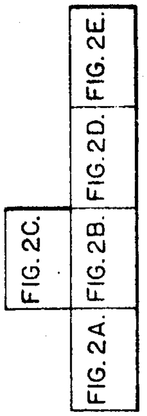
FIG. 5 illustrates the arrangement of FIGS. 2A through 2E.

Referring in detail to the drawings by numerals of reference, FIGS. 1A and 1B illustrate the transmitting portion of the system which causes the transmission of the code cycle by way of a directive loop antenna 10. The transmission portion of the system is comprised of an amplifier 12 for providing the proper amplification of the output frequencies to the antenna 10; a frequency shift oscillator 14, which provides the input frequencies to the amplifier 12; and a center frequency shift circuit 16, and a low frequency shift circuit 18, which when operated shift the output frequency from the frequency shift oscillator 14 from a high to a center or from a high to a low frequency, respectively. The low frequency shift circuit 18 is controlled by a binary counter 20, a code forming matrix 24, and a one-shot multivibrator 26. The center frequency shift circuit 16 is controlled by the output from a timing oscillator 22 and the one-shot multivibrator 26. The timing oscillator 22 in effect forms the pulses in each code cycle, and permits a center frequency pulse to be transmitted between each high or low frequency pulse. The binary counter 20 determines the number of code pulses in each cycle, and is controlled to count at a rate determined by the timing oscillator 22. The code forming matrix 24 (FIG. 1B) is governed by the binary counter 20, and by the information to be transmitted to determine the character of each of the pulses between the center frequency pulses, that is, whether or not the pulses are to be of a high or a low frequency. A one-shot multivibrator 26 is operated by the binary counter 20 and operates the center frequency shift circuit at the end of each code cycle to cause the frequency shift oscillator to provide a center frequency output of longer duration than those center frequency pulses transmitted during the cycle that separate the high and low pulses of a code cycle. Also, the one-shot multivibrator 26 operates the low frequency shift circuit to insure that no low frequency pulse will be transmitted between each code cycle.

Referring to FIGS. 2A through 2E, the code cycle is effectively received from the transmitter of FIGS. 1A and 1B whenever an antenna 300 of the receiving apparatus is in close proximity to the antenna 10 (FIG. 1A) of the transmitter.

The receiving apparatus is comprised of a broad band amplifier 302 which is effective to amplify the incoming high, center and low frequencies. These amplified signals are detected by a high frequency detector 303, a center frequency detector 304, and a low frequency detector 306, respectively.

The frequency detectors 303, 304 and 306 are so arranged to eliminate the usual extraneous noise interferences, and to provide a distinctive output to a low frequency amplifier and Schmitt trigger circuit 307 upon the detection of a low frequency digit, and to provide a distinctive output to a high frequency amplifier and Schmitt trigger circuit 308 upon the detection of a high frequency digit.

The Schmitt trigger circuits 307 and 308 are used to square up the waveforms of their respective incoming signals to provide definitely spaced output signals to a validating and blanking circuit 311.

The validating circuit 311 provides an output to a pulse amplifier 312 upon the operation of each of the trigger circuits 307 and 308, but prevents an output to the pulse amplifier 312 if both the trigger circuits 307 and 308 should operate simultaneously, which in effect provides a gate to the pulse amplifier 312. The interlocking circuit 311 also provides another output upon the operation of the trigger circuit 308 only, which is operated by each high frequency pulse. A transfer generator 313, which is a monostable or one-shot multivibrator, provides pulses at the end of each pulse period from the output of the pulse amplifier 312 of a predetermined amount, such as thirty microseconds, for example. The pulses from the monostable multivibrator 313 are amplified by an output amplifier 314. The output from the amplifier 314 applies these amplified pulses to a shift register 316. The pulses from the output of the amplifier 314 provide the first step for shifting the shift register 316. This thirty microsecond pulse clears all of the digits in the shift register 316 so that they may receive the transferred input information as will hereinafter be described.

A transfer generator 317, which is a monostable multivibrator is operated by the monostable multivibrator 313 to generate a pulse immediately after the pulse from the output amplifier 314 is completed. The duration of this pulse may be in the order of twenty micoseconds, for example. An output amplifier 318 is provided to amplify the twenty microsecond pulse from the monostable multivibrator 317. This twenty microsecond pulse is the second step and causes the shift register to shift one digit to the right as viewed in FIGS. 2D and 2E.

The shift register 316 is comprised of a plurality of stages or digits, which correspond in number to the number of digits in a complete code cycle plus one. It operates so that at the beginning of a code cycle all of its digits are in the OFF condition. Upon the reception of the first digit of the code cycle the first digit of the shift register is operated in accordance with the code characteristic of this digit. The shift register then shifts so that the condition of the second digit now becomes the previous condition of the first digit of the shift register and the second digit of the code cycle received operates the first digit of the shift register. This sequence occurs until all of the digits of the shift register 316 are filled, that is, are in a particular combination of conditions in accordance with the code cycle received. The output pulse from the amplifier 314 conditions the shift register 316 so that the coded information may be read in; and the output pulse from the output amplifier 318 then shifts the shift register one stage or digit to the right as previously mentioned.

A lock-up device 320 of the shift register is provided so that the information stored therein at the end of a code cycle is retained or "locked up."

An amplifier 321 is provided to amplify any high frequency pulses from the output of the validating and blanking network 311. The output of the amplifier 321 determines whether the information stored in each of the stages of the shift register as received corresponds to a high or a low frequency pulse.

Clamping stage 319 is operated by an output from the pulse amplifier 312 and detects the sequential occurrence of each pulse of a code cycle. Clamping stage 319 supplies an output to an off-time detector 322 which, in turn, provides an output to a so-called reset pulse generator 324, which is a monostable multivibrator that is operated in a characteristic manner whenever a code pulse of a cycle is missing, and at the end of each code cycle. Also, the multivibrator 324 is influenced by pulses which are shorter than normal.

Reset pulse generator 324 restores the shift register 316 to the condition that it is in just prior to the beginning of each code cycle by applying a reset pulse to the shift register through output amplifier 314. The multivibrator 326 prevents any output from the validating and blanking network 311 during a predetermined period of time. Thus, after each code cycle the shift register 316 is restored to its original condition, provided that a complete message is not then being stored in the shift register. Also, if there are any pulses missing during a code cycle, or a pulse which is too short is selected, the shift register 316 is restored to its original condition until the receiver detects a complete code cycle.

The timing oscillator 22 (FIG. 1A) is a common emitter coupled multivibrator that is self-starting and free running, and provides a substantially square wave output. It is comprised of a pair of PNP transistors 60 and 62, each of which has its base terminal connected through a resistor 63 and 64, respectively, to a positive potential source, such as six volts, for example, connected to a bus 66. This guarantees that when the transistor 60 or 62 is turned on their collectors will be positive with respect to ground. The emitter terminal of the transistors 60 and 62 are connected through resistors 67 and 68 to the bus 66 and are commonly connected to each other through a coupling capacitor 70.

The collector terminal of the transistor 60 is connected through a resistor 71 to the base of the transistor 62, through a resistor 72 to a source of negative potential, such as −12 volts, for example, that is connected to a bus 73, an output wire 74 connected to the input of the center frequency shift circuit 16; and to synchronizing output wire 76 that is connected to the input of the one-shot multivibrator 26. The collector terminal of the transistor 62 is connected through a resistor 77 to the base of the transistor 60; through a resistor 78 to the negative bus 73; and to an output wire 80 connected to the binary counter 20. The output wire 80 is also connected to the input of the low frequency shift circuit 18.

When power is applied to the buses 73 and 66, either one or the other of the transistors 60 and 62 are caused to conduct or turn "on" because of the natural unbalance in the circuit. In a conventional manner the conducting of one of the transistors 60 and 62 causes the other of these transistors to be nonconductive or turned "off." For example, when the transistor 60 is turned on, the capacitor 70 is charged by the circuit which extends from the negative bus 73 and includes resistor 72, the transistor 60, the capacitor 70, the resistor 68, and the positive bus 66. The collector terminal of the transistor 60 at this time is at a potential, substantially the same as the negatively charged value on the left-hand side of the capacitor 70 as viewed in FIG. 1A. As the capacitor 70 begins to charge exponentially, the emitter terminal of the transistor 62 becomes less negative; and when the emitter terminal of the transistor 62 is positive with respect to its base terminal, the transistor 62 becomes conductive or turns on, and the transistor 60 turns off. The transistor 62 then charges the capacitor 70 in the other direction by a circuit extending from the negative bus 73, through the resistor 78, the transistor 62, the capacitor 70, the resistor 67, and the positive bus 66. The collector terminal of the transistor 62 resides at the negatively charged value at the right-hand side of the capacitor 70 as viewed in the drawings. When the capacitor 70 charges in this direction, the emitter terminal of the transistor 60 becomes less negative than its base and turns on the transistor 60. It is apparent that this action produces an oscillating effect which provides a train of square wave pulses referred to at 81 (FIG. 3A) on the busses 74 and 76 that are connected to the collector terminal of the transistor 60, and a train of square wave pulses referred to at 82 (FIG. 3A) on the bus 80 that is connected to the collector terminal of the transistor 62. As shown in FIG. 3A, the pulses 81 and 82 are positive and negative going in an alternate fashion as their respective transistors 60 and 62 conduct. The frequency of oscillation is determined by the value of the capacitor 70 and the resistors 67, 68, 72 and 78. When the pulse 81 is positive going, that is, when the transistor 60 is turned on, the center frequency shift circuit 16 is operated over output wire 74, and an effective output is provided over wire 76 to the one-shot multivibrator 26. When the pulse 82 is positive going, that is, when the transistor 62 is turned on, an effective output is provided to operate the counter 20 over the wire 80 and also to operate the low frequency shift circuit 18 as governed by the counter 20 and the diode matrix 24.

The frequency shift oscillator 14, which is a common emitter coupled oscillator is comprised of a transistor 83 and a transistor 84. The emitter terminals of these transistors 83 and 84 are commonly connected through a resistor 86 to a bus 87 that is connected to ground potential. The collector terminal of the transistor 83 is connected through a resistor 88 to the negative bus 73. The collector terminal of the transistor 84 is connected directly to the negative bus 73. The base terminal of the transistor 83 is connected to the negative bus 73 through a resistor 89 and to ground through a resistor 90. The base of the transistor 84 provides the output to the amplifier 12 over a wire 85. The frequency determining network of the oscillator 14 is a tank circuit that is comprised of a coil 91 and a capacitor 92 that are parallel connected. The tank circuit is connected across the base terminals of the transistors 83 and 84. A bypass capacitor 93 is connected across the resistor 90 to serve as a bypass for radio frequencies, and also to connect the tank circuit that is comprised of the coil 91 and the capacitor 92, across the wires 85 and 87. The value of resistors 89 and 90 is selected so that the bus 85 can never go more positive than the bus 87. A capacitor 94 connects the base of the transistor 84 to the collector terminal of the transistor 83 which serves as a coupling device. The frequency shift oscillator 14 normally supplies the so-called high frequency.

The frequency shift oscillator 14 is also provided with a transistor 96, which has its collector terminal connected through a capacitor 97 to the bus 85, and its emitter terminal connected through a diode 98 to the bus 87. The base of the transistor 96 is connected through a resistor 100 to the bus 87, and thus ground potential. The transistor 96 when conductive in effect connects the capacitor 97 in parallel with the capacitor 92 of the tank circuit which lowers the output frequency of the oscillator 14 to supply a so-called center frequency. A transistor 101, which has its collector terminal connected through a capacitor 102 to the bus 85, its emitter terminal connected through a diode 103 to the bus 87, and its base connected through a resistor 104 to the bus 87 is provided for lowering still further the output frequency of the frequency oscillator 14. When both the transistors 96 and 101 are conducting, both capacitors 97 and 102 are effectively included in the tank circuit with the capacitor 92 to provide a so-called low frequency.

The transistor 96 conducts when a negative potential is being applied effectively to terminals through a diode 106 and a resistor 107 from the center frequency shift circuit 16. Both the transistors 96 and 101 conduct when a negative potential is applied to the base of the transistor 96 through a diode 108 and a resistor 110, and to transistor 101, through diode 111 and resistor 112 from the low frequency shift circuit 18 on wires 109.

Figure 3:
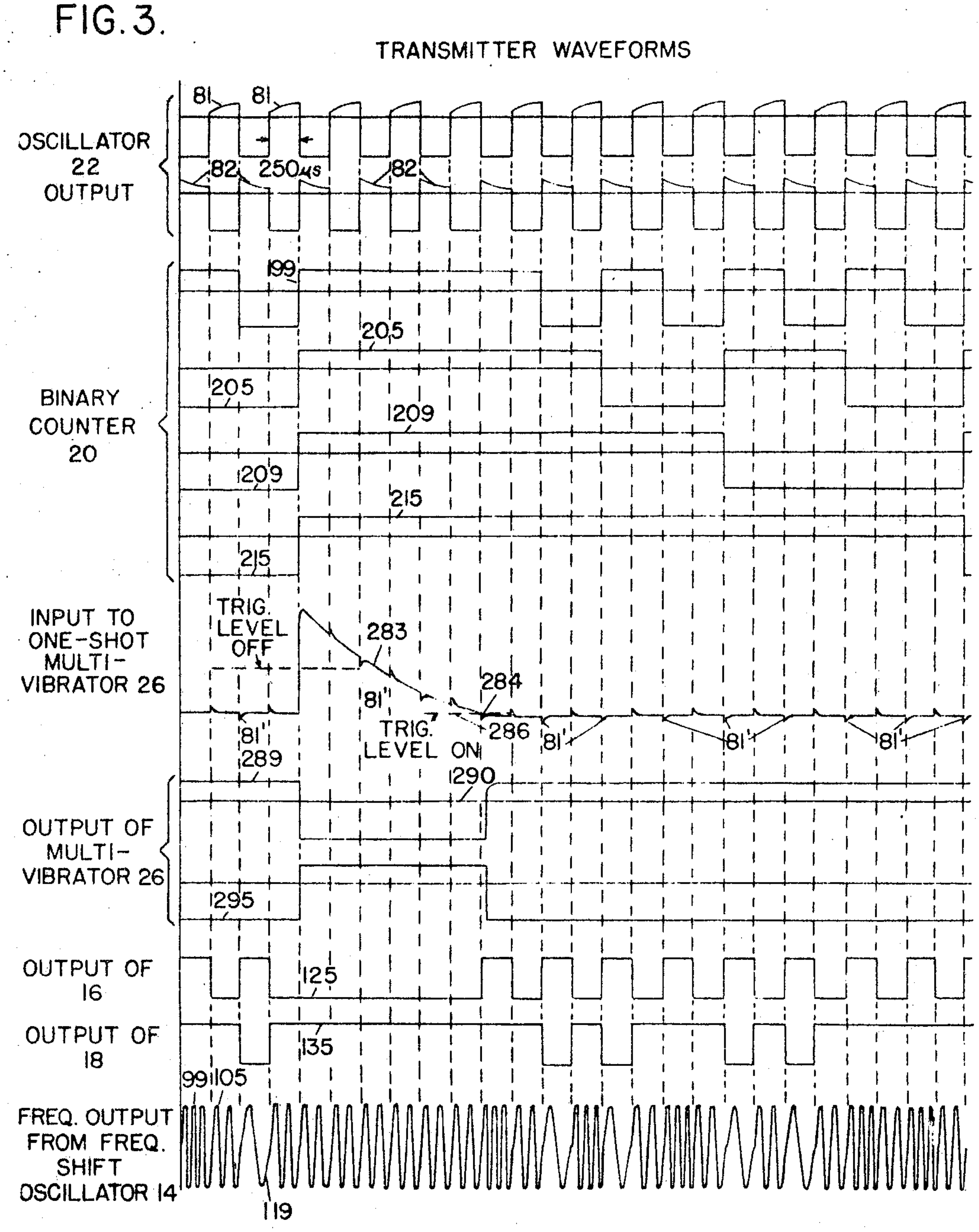
FIG. 3 illustrates graphically certain waveforms which occur in designated positions of the transmitting portion of the system.

Referring to FIG. 3 the high frequency output is represented by the waveform referred to at 99, which may be four hundred kilocycles, for example. The center frequency output is represented by the waveform referred to at 105 which may be three hundred ninety kilocycles, for example. The low frequency output is referred to at 119 which may be three hundred eight kilocycles, for example.

The center frequency shift circuit 16 is comprised of a transistor 113, which has its emitter terminal connected through a diode 114 to ground potential, its collector terminal connected through a resistor 116 to the negative bus 73 and to the diode 106. The base of the transistor 113 is connected to ground and the positive side of the diode 114 through a resistor 117. The base of the transistor 113 is also connected through a diode 118 and a resistor 120 to the output wire 74 that is connected to the collector terminal of the transistor 60 in the timing oscillator 22. The base terminal of the transistor 113 is also connected through a diode 121 to the output of the one-shot multivibrator 26. The transistor 113 is conducting to cause the transistor 96 to be shut off when there is no negative potential applied to its base either over the bus 74 or a bus 175 which is the output from the one-shot multivibrator 26. With regard to the bus 74, when the transistor 60 of the timing oscillator 22 is conducting, a positive potential is applied thereto which causes the transistor 113 to shut off, and when the transistor 60 stops conducting the transistor 113 turns on. Therefore, since the turning on of the transistor 113 in the center frequency shift circuit 16 is effective to shut off the transistor 96 to remove the effect of the capacitor 97, the frequency transmitted from the frequency shift oscillator 14 to the amplifier 12 is a center frequency each time the transistor 60 of the oscillator 22 turns on. Referring to FIG. 3, the turning on and off of the center frequency shift circuit 16 is represented by the waveform 125. Therefore, because transistors 60 and 62 of the timing oscillator 22 alternately turn on and off, a center frequency is transmitted between the high or low frequency pulses, which serve as the space between the digits of the code. The effect of the one-shot multivibrator 26 will be described hereinafter.

The low frequency shift circuit 18 is similar to the center frequency shift circuit 16, and is comprised of a transistor 122 which has its collector terminal connected to the diode 108, the diode 111, and a resistor 112' to the source of negative potential such as —12 volts for example. The base terminal of the transistor 122 is connected through a resistor 123 to ground potential, and its emitter terminal connected through a diode 124 to ground. When the transistor 122 is conducting, the transistors 96 and 101 are cut off and a high frequency is transmitted from the frequency shift oscillator 14. Referring to FIG. 3, the turning on and off of the low frequency shift circuit 18 is represented by the waveform. Because the low frequency shift circuit 18 is controlled by the transistor 62 of the timing oscillator 22 during a code cycle, the high frequency occurs when the transistor 62 is conducting and the transistor 60 is shut off; and thus when the transistor 62 causes the transistor 122 to be rendered nonconductive or turned off, a low frequency will be provided at the output of the frequency shift oscillator 14. The conducting of the transistor 122 is controlled by the output on bus 80 through a resistor 126 and a diode 127. The transistor 122 is also controlled through its base over output wire 129 from the diode matrix 24 for controlling the low frequency shift circuit 18 in accordance with the code forming matrix 24 (FIG. 1B). Thus, the low or high frequency transmission of a pulse can occur only when the transistor 62 is conducting, and the selection of this low or high frequency pulse is determined by the code forming matrix 24. The transistor 122 is also controlled by the output on a bus 128 through a resistor 130 and a diode 132 which is connected to the one-shot multivibrator for purposes hereinafter described.

The amplifier 12 which amplifies the output frequencies from the frequency shift oscillator 14 to be transmitted from the antenna 10 is comprised of transistors 133 and 134 that are connected in a conventional manner well known in the art.

The binary counter 20 is provided to count those digits of a cycle which are to be either high or low frequency pulses, control the proper sequence of the occurrence of each pulse as governed by the diode matrix 24 and be controlled by the one-shot multivibrator 26 to mark the period between each complete cycle. The binary counter 20, which is comprised of transistors 136 and 137, transistors 138 and 140, transistors 141 and 142, and transistors 143 and 144, all have their emitter terminals connected to a common bus 146 which is connected through diodes 147 and 148 to a bus 150 that is connected to a source of positive potential, such as six volts, for example. The collector terminals of the transistors 136, 137, 138, 140, 141, 142, 143 and 144 are all connected through respective load resistors 156, 157, 158, 160, 161, 162, 163 and 164 to a bus 166 that is connected to a source of negative potential such as —12 volts, for example. A resistor such as 139 is connected between the capacitor 168 and diode 167 and the collector of transistor 136 to form a conventional steering circuit. The other transistors in the binary counter 20 are similarly connected.

The base terminal of transistor 136 is connected to the output bus 80 of the timing oscillator 22 through a diode 167 and an isolating capacitor 168, and through a biasing resistor 170 to a bus 153 that is connected to a source of negative potential such as —10 volts, for example. The base of the transistor 137 is connected to the positive bus 150 through a load resistor 171, and is connected through a diode 172 and an isolating capacitor 173 to the output bus 80.

The base of the transistor 138 is connected through a biasing resistor 174 to the negative bus 153, and through a diode 176 and an isolating capacitor 177 to a bus 178 that is connected to the collector terminal of the transistor 136. The base of the transistor 140 is connected through a biasing resistor 180 to the positive bus 150, and is connected to the wire 178 through a diode 181 and an isolating capacitor 182.

The base of the transistor 141 is connected to the negative bus 153 through a biasing resistor 183, and through a diode 184 and an isolating capacitor 186 to a bus 187 that is connected to the collector terminal of the transistor 138. The base of the transistor 142 is also connected to the bus 187 through a diode 188 and an isolating capacitor 190, and is connected to the positive bus 150 through a biasing resistor 191.

The base of the transistor 143 is connected through a biasing resistor 192 to the negative bus 153, and is connected through a diode 193 and an isolating capacitor 194 to a bus 196 that is connected to the collector terminal of the transistor 141. The base of the transistor 144 is also connected to the bus 196 through a diode 197 and an isolating capacitor 198, and is connected to the positive bus 150 through a biasing resistor 200. A current feed resistor 201 is connected across the buses 166 and 153.

The binary counter 20 is actually a plurality of bistable multivibrators, and in the illustrated embodiment four such multivibrators are provided which are so connected to count a cycle having sixteen digits. The transistors 136 and 137 which comprise one such multivibrator are effective to be switched on and off alternately by the application of a positive going pulse to the bus 80 from the output of the transistor 62 of the timing oscillator 22. Referring to FIG. 3, the operation of the transistor 136 is represented by the waveform referred to at 199. The transistors 138 and 140 which comprise a second multivibrator are effective to be switched on and off alternately by the application of a positive pulse to the wire 178 that is connected to the collector terminal of the transistor 136. Referring to FIG. 3 the operation of the transistor 138 is represented by the waveform 205. The transistors 141 and 142, which comprise a third multivibrator, are effective to be switched on and off alternately upon the application of a positive going pulse to the bus 187 that is connected to the collector terminal of the transistor 138. Referring to FIG. 3 the operation of the transistor 141 is represented by the waveform referred to at 209. The transistors 143 and 144 which comprise a fourth multivibrator, are effective to be switched on and off alternately upon the application of a positive going pulse to the wire or bus 196 that is connected to the collector terminal of the transistor 141. Referring to FIG. 3 the operation of the transistor 143 is represented by the waveform 215. The absence of the positive potential applied to the bus 153 through a diode 202 is effective to prevent the turning off of the transistors 136, 138, 141, and 143 between each code cycle as will be described in detail hereinafter. It follows that between each code cycle, or during the so-called blanking period, the transistors 137, 140, 142, and 144 are all turned off, and the binary counter 20 is in the proper condition to begin a code cycle. The beginning of the code cycle occurs when the transistor 60 of the oscillator 22 turns off, which turns on the transistor 113 of the center frequency shift circuit 16 as previously described. This beginning of the code cycle may be referred to as the zero digit. It should be noted at this time that the transistor 62 is unable to operate the counter 20 over its output wire 80 because of the condition of the multivibrator 26 to be described, and the transistor 122 of the low frequency shift circuit 18 remains turned on because of the negative potential on wire 129 at the output of the diode matrix 26. This provides a high frequency output. Next the transistor 60 turns on during the zero digit and the transistor 62 turns off, which causes the transistor 113 of the center frequency shift circuit 16 to turn off thereby causing the frequency shift oscillator 14 to provide a center frequency following the transmission of the high frequency pulse at the beginning of the cycle. This marks the end of the zero digit.

At the beginning of the first digit of the cycle the transistor 60 of the timing oscillator 22 turns off which causes the transistor 113 of the center frequency shift circuit 16 to turn on. The fact that the transistor 62 is now turned on at the beginning of the first digit causes the transistor 136 of the binary counter 20 to be turned off by the application of positive potential over the output wire 80. When the transistor 60 turns on during this digit, the transistor 113 of the center frequency shift circuit 16 is again turned off to cause the transmission of a center frequency. Thus, it is seen that each time the transistor 62 turns on and the transistor 60 turns off the first multivibrator which comprises the transistors 136 and 137 is switched. Also, the center frequency shift circuit 16 is rendered ineffective to operate frequency shift oscillator 14 and the character or code of each digit is controlled solely by the operation of the transistor 122 of the low frequency shift circuit 18. This sequence of events occurs for each digit of the code cycle and the operation of the second multivibrator is caused by the operation of the first multivibrator, and the operation of the third multivibrator is caused by the operation of the second multivibrator, and the operation of the fourth multivibrator is caused by the operation of the third multivibrator. It should also be noted that the first multivibrator is operated only when the transistor 62 of the timing oscillator 22 turns on. Also, that the second multivibrator comprised of the transistors 138 and 140 is operated only when the transistor 136 is turned on. Thus, each bistable multivibrator of the binary counter 20 in effect divides the output of each preceding multivibrator by the factor of two. Therefore, the fourth multivibrator comprised of the transistors 143 and 144 which is operated at the beginning of each eighth digit or the middle of each cycle. With sixteen digits in the cycle, the transistor 143 is turned off therefor at the beginning of the eighth digit and turned on at the end of the cycle.

The present embodiment of the invention is so constituted that on the fifteenth digit or last digit of the cycle the transistor 136 is off, the transistor 137 is on, the transistor 138 is off, the transistor 140 is on, the transistor 141 is off, the transistor 142 is off, the transistor 143 is off, and the transistor 144 is on. Thus, at the beginning of the so-called blanking period the turning on of the transistor 136 which is effective to switch the second, third and fourth multivibrators of the binary counter 20 so that the transistor 138 is on, the transistor 141 is on, and the transistor 143 is on.

Each transistor of the binary counter 20 has its collector terminal connected to an output wire leading to the diode matrix 26. The transistor 136 is provided with an output wire 206. The transistor 137 is provided with an output wire 207, the transistor 138 is provided with an output wire 208, transistor 140 is provided with an output wire 210. Transistor 141 is provided with an output wire 211. Transistor 142 has an output wire 212. Transistor 143 has an output wire 213. Transistor 144 has an output wire 214. When a respective transistor of the binary counter 20 is turned on, its associated output wire has a positive potential applied thereto. Because during each digit of a code cycle and the blanking period a different combination of transistors in the binary counter 20 are turned on or off, the associated output wires are correspondingly energized with a positive potential that is of a different combination for each digit of the cycle.

Referring to FIG. 1B, the diode matrix 24 has an output wire 129 which is connected to the base terminal of the transistor 122 (FIG. 1A) of the low frequency shift circuit 18. Whenever this output wire 129 has a negative current applied thereto of a predetermined value supplied by drive resistor such as 240 and 248, the transistor 122 is turned on which causes the frequency shift oscillator 14 to provide a high frequency output. Whenever the wire 129 has a positive potential applied thereto at the beginning of a digit, the transistor 122 of the low frequency shift circuit 18 is turned off thereby causing the transmission of a low frequency. The source of negative potential for energizing the wire 129 is provided by a bus, such as the bus 73 (FIG. 1B) which is connected to a −12 volt source. The potential for rendering the output wire 129 positive on each separate digit is provided by the bus 150 (FIG. 1B) which is connected to a positive voltage source such as six volts for example.

The binary information to be transmitted on each digit of the cycle is in accordance with the open or closed condition of contacts referred to at 221 through 235 consecutively. These contacts 221 through 235 are assumed to be operatively connected to a relay or other suitable conventional binary device. For example, the contacts 221 through 224 may be used to form a binary code for the first decimal number in the identification of a train. The contacts 225 through 228 may be used to form a binary code corresponding to the second decimal number in the identification of a train. The contacts 229 through 231 may be used to form a binary code corresponding to the first decimal number of the speed of a train. The contact 232 may be used to determine whether the second decimal number of the speed is to be a zero or a five. Finally the contacts 233 through 235 may be used to transmit information corresponding to the condition of the power apparatus of the train, that is whether it is accelerating or decelerating or whether it is in a power or a braking condition.

The output wires 206, 207, 208, 210, 211, 212, 213, and 214 of the binary counter 20 are so connected in the diode matrix 24 that they permit the binary information from each one of the contacts 221 through 235 to be transmitted only during a certain digit of the code cycle.

It should be understood that if there is no positive potential from either the output wires of the binary counter 20 or the bus 150 applied to the wires referred to at D1 through D15 consecutively and the zero wire, a negative potential will be applied to the wire 129 connected to the input of the low frequency shift circuit 16. The various diodes illustrated and connected in the matrix 24 are so arranged that a positive potential is applied to each of the wires zero and D1 through D15 with the exception of the particular wire D1 through D15 which corresponds to the digit of the code transmitted. Thus, it may be said that the binary counter 20 inhibits the negative potential of all wires D1 through D15 and zero except that one corresponding to the particular digit being transmitted in the code cycle; and this particular wire has either a negative potential or a positive inhibiting potential thereto in accordance with the open or closed condition of its respective contact 221 through 235. For example, in the zero digit at the beginning of a code cycle a negative potential is applied to the wire 129 which extends from the bus 73 and includes a resistor 240, diode 241, diode 242, diode 243, and diode 244 to the output wire 129. It should be recalled at this time that there is no positive output from the wire 207, 210, 213, and 214 to inhibit the application of negative potential from the zero wire to the output wire 129. It can be seen at this time that the on or off conditions of the transistors in the binary counter control the back biasing of positive potential to the zero output wire.

At the beginning of the first digit, the wire 207 has a positive potential applied thereto and no negative potential can be applied to the wire 129 from the zero wire because of the forward connection of a diode 246. It should also be noted that no negative potential can be applied to the wire 129 over the wire D2 because the output wire 207 is positive which causes the back biasing positive potential to be applied thereto through a diode 247. Similarly with regard to the other wires D3 through D15 there is at least one diode which applies a positive back biasing potential to the wire to prevent the application of a negative potential thereto. With regard to the first digit, which is being transmitted a negative potential may be applied to the wire 129 from the bus 73 through resistor 248, diode 250, the diode 242, the diodes 243, and the diode 244. The fact that the output wire 206 from the transistor 136 of the binary counter 20 is now negative because it is in its off condition. The bias which formerly was applied to the wire D1 through diode 251 is removed during the first digit. However, if the contact 221 is closed there will be no negative potential applied to the output wire 129. Thus, the binary counter 20 in cooperation with the diode matrix 24 permits a binary code to be transmitted in serial form by permitting a negative potential to be applied to the output wire 129 leading to the low frequency shift circuit 18 through each one of the wires zero, and D1 through D15 in succession. Therefore if the contact 221 is open, during the first digit of the code cycle a high frequency pulse will be transmitted because the negative potential applied to the wire 129 causes the low frequency shift circuit to remove the effect of the capacitors 97 and 102 in the frequency shift oscillator 14. However, if during this digit the contact 221 is closed a low frequency is transmitted because the transistor 122 of the frequency shift circuit 18 is turned off which permits the transistors 96 and 101 of the frequency shift oscillator 14 to be turned on so that the capacitors 97 and 102 are included in the tank circuit that is comprised of the coil 91 and the capacitor 92.

BLANKING PERIOD

Referring to FIG. 1A the one-shot multivibrator 26 is comprised of a transistor 260 and a transistor 261. The transistor 260 has its collector terminal connected through a resistor 262 to the bus 73. The collector terminal of the transistor 261 is connected through a resistor 263 to the bus 73. The collector terminals of the transistors 260 and 261 are commonly connected through a diode 264 to the positive bus 66. The base of the transistor 260 is connected through a resistor 266 to the negative bus 73, and the base of the transistor 261 is connected through a resistor 267 to the positive bus 66.

The output wire 175 that is connected through the diode 121 to the base of the transistor 113 of the center frequency shift circuit 16 is connected to the collector terminal of the transistor 261 of the one-shot multivibrator 26 to apply a positive potential to the base of the transistor 113 to shut off this transistor when the transistor 261 is conducting or turned on. The base of the transistor 260 is connected to the collector terminal of the transistor 143 of the binary counter 20 by a wire 268. This causes a positive potential to be applied to the wire 268 when the transistor 143 turns on, which is at the end of each cycle, for shutting off the transistor 260. A capacitor 270 is included in the output wire 268 and a diode 271 is connected to one side of the capacitor and the positive bus 66 for causing a sharp differentiated positive pulse to be applied to the base of the transistor 260 when the transistor 143 turns on.

The collector terminal of the transistor 260 is connected by the output wire 128 to the base terminal of the transistor 122 through the resistor 130 and the diode 132 for turning the transistor 122 on when the transistor 260 turns off during the blanking period by permitting a negative potential to be applied from the negative bus 73 through the resistor 262.

A series connected capacitor 276 and a resistor 277 are connected across the collector terminal of the transistor 261 and the base terminal of the transistor 260 to provide a time constant in accordance with their respective values for turning the transistor 260 on after it has been turned off by the positive spike on the wire 268 that is connected to the base of the transistor 260. The base of the transistor 260 is also connected to the capacitor 278 and a resistor 280 to the collector terminal of the transistor 60 of the timing oscillator 22 for insuring that the transistor 260 turns on at an exact time, that is, when the transistor 60 of the timing oscillator 22 turns off.

During the cycle, the transistor 260 is conducting and the transistor 261 is turned off, and the capacitor 276 is charged so that its right-hand side is negative as viewed in the drawings. Referring to FIG. 3, the operation of the transistor 260 is represented by the waveform 289, and the operation of the transistor 261 is represented by the waveform 295. When the differentiated positive spike from the transistor 143 shuts off the transistor 260 at the end of a code cycle and the transistor 261 turns on, the capacitor 276 begins to discharge through a circuit which includes the resistor 277, resistor 266 to the negative bus 73. The time for discharging the capacitor 276 determines the length of the blanking period between each code cycle. This discharging of the capacitor 276, or in other words its decaying charge is illustrated by line 283 of FIG. 3. It is apparent that when the potential at the junction of the resistors 266 and 267 caused by the discharge of the capacitor 276 becomes sufficiently negative, or when the value falls below the trigger level of the transistor 260, the transistor 260 will turn on. Because this is a relatively gradual occurrence, and it is desired to turn on the transistor 260 at an exact time in accordance with the condition of the timing oscillator 22, the negative going pulse from the collector terminal of the transistor 60 when it shuts off aids the negative going potential through the resistor 280 and the capacitor 278. This is illustrated by the waveform 81′ superimposed with the waveform 283 of FIG. 3. To illustrate this principle, the transistor 260 turns on when the negative going pulse referred to at 284 causes the potential applied to the base of transistor 260 to fall below the trigger level as represented by dashed line 286 of FIG. 3. In the illustrated embodiment of the invention the system is so designed that the time between each code cycle is equal to three digits of the cycle.

Thus, to summarize, when the transistor 260 turns off at the end of a code cycle, the turning on of the transistor 261 shuts off the transistor 113 of the center frequency shift circuit so that the transmitter will produce a center frequency. The turning off of the transistor 260 at this time applies a negative potential to the wire 128 so that the transistor 122 of the low frequency shift circuit is turned on, which insures that no low frequency is transmitted between code cycles. The turning off of the transistor 260 removes the positive biasing potential to the negative bus 153, which is applied to the wire 128 and through the diode 202 during a code cycle. This removal of the positive biasing potential prevents the binary counter from being operated by the timing oscillator 22 between code cycles, i.e. during the blanking period.

When the transistor 260 turns on at the end of the blanking period in the manner previously described upon the turning off of the transistor 60 of the timing oscillator 22, the transistor 261 turns off. The turning on of the transistor 260 removes the negative potential from the base of the transistor 122 of the low frequency shift circuit by way of the wire 128, and because at this time the transistor 62 of the timing oscillator 22 is on, no negative potential is applied to the base of the transistor 122 over the output wire 80, and the zero bus of the matrix is applying a negative current to wire 129, the transistor 122 remains on so that a high frequency is transmitted. The turning off of the transistor 261 at this time removes the positive potential from the wire 175 that is connected to the base of the transistor 113 of the center frequency shift circuit 16, and because the transistor 60 is off at this time the transistor 113 is turned on which, as previously described, causes the transmission of a high frequency to mark the beginning of the zero digit of the code cycle.

The turning on of the transistor 260 at this time also applies a positive potential over the wire 128 and through the diode 202 so that the binary counter 20 may again be operated by the timing oscillator 22. Because of a very slight time differential in the circuit as illustrated by that portion of the output waveform referred to at 290 of FIG. 3, the turning on of the transistor 62 does not actuate the binary counter during the zero digit.

The timing oscillator 22 then operates so that the transistor 60 turns on and the transistor 62 turns off. This turns off the transistor 113 of the center frequency shift circuit to cause the transmission of a center frequency after the first high frequency of the zero digit. The transistor 122 still remains on during this transmission of the zero digit because of the application of negative potential to the zero bus (FIG. 1B) of the diode matrix 24 as previously described. At the beginning of the first digit of the code cycle the transistor 62 turns on and the transistor 60 turns off. The turning on of the transistor 62 shuts off the transistor 136 of the binary counter 20 and removes the negative potential from the base of the transistor 122 by way of the output wire 80 so that the operation of the low frequency shift circuit 18 is controlled solely by the diode matrix 24. The transmitting apparatus operates during the remainder of the code cycle as previously described.

RECEIVER

Referring in detail to FIGS. 2A through 2E by numerals of reference, the broad band radio frequency amplifier 302 (FIG. 2A) which amplifies the signals from the tuned loop 300 is comprised of NPN transistors 330, 331 and 332. The emitter terminals of each of the transistors 330, 331, and 332 are connected through a respective resistor 333, 334, and 336 to a bus 337, which is connected to a source of positive potential such as nine volts, for example. The base terminals of these transistors are connected to voltage dividing networks for providing the proper bias. The base terminal of the transistor 330 is connected through a resistor 338 to the bus 337, and through a resistor 340 to its collector terminal. The base of the transistor 331 is connected through a resistor 341 to the bus 337, and through a resistor 342 to its collector terminal. The base of the transistor 332 is connected through a resistor 343 to the bus 337 and through a resistor 344 to a bus 346 which is connected to a source of positive potential such as eighteen volts, for example. The collector terminals of the transistors 330, 331, and 332 are connected to the positive bus 346; the transistor 330 being connected thereto through resistors 347 and 348; the transistor 331 being connected thereto through resistor 350; and the collector terminal of the transistor 332 being connected thereto through a tank circuit, comprised of a capacitor 351 and a primary winding 352 of a transformer 353. Capacitors 354 and 356 transfer the energy from one transistor 330 to the next transistor 331 and the transistor 332 respectively. Capacitor 357 merely tunes the loop antenna 300 to approximately the center frequency of the broad banded frequencies included in the high, center, the low frequencies employed in the system. A capacitor 358, which is connected between the resistors 357 and 348 is a filter capacitor which forms a L network to bypass any noise appearing between the bus 346 and the bus 337 and prevent regeneration in unit 302.

Figure 4A:
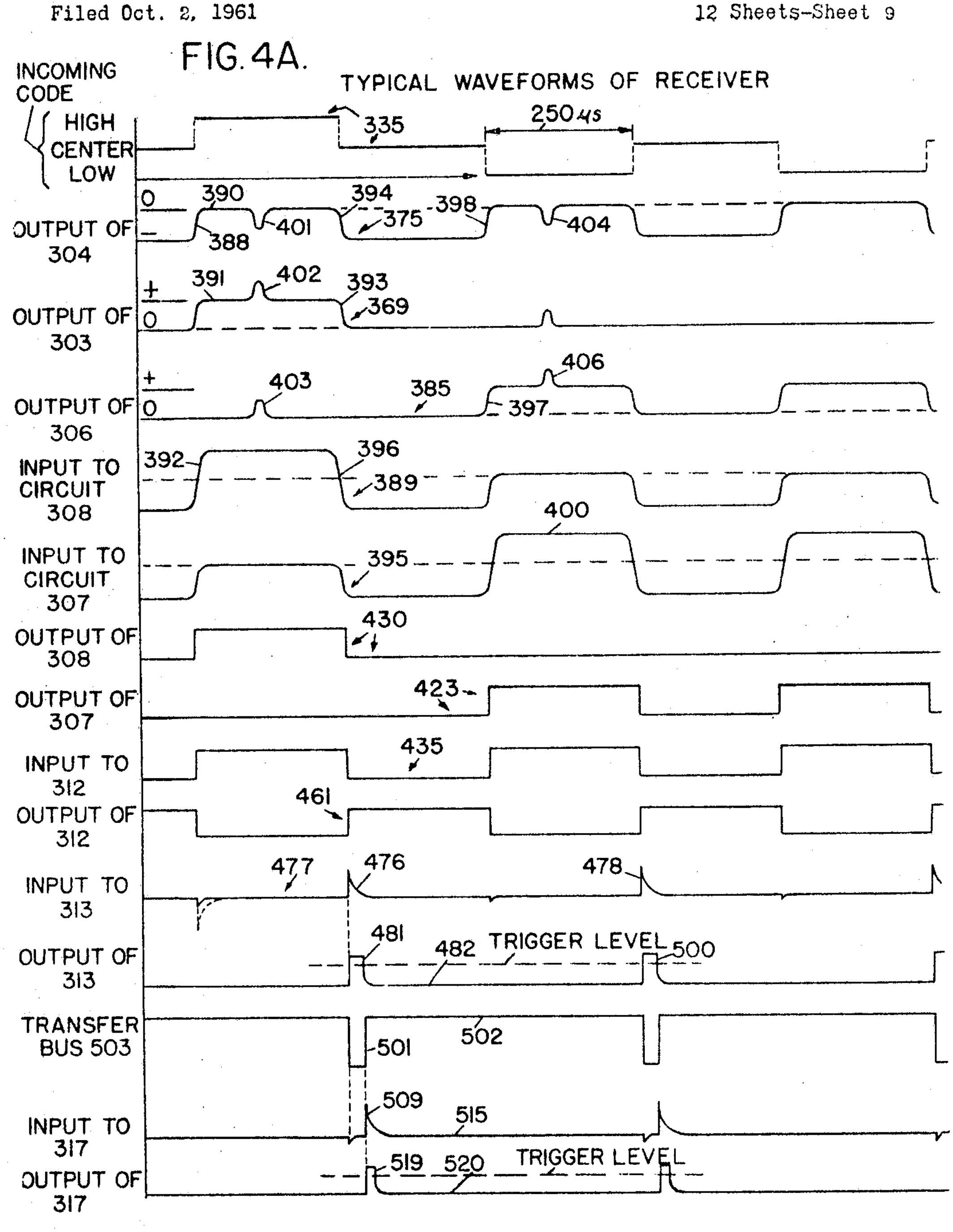
FIGS. 4A and 4B illustrate graphically various waveforms which occur in designated portions of the receiving apparatus of the system.

The input to the broad band amplifier 302 is over a wire 360 which connects the tune loop 300 to the base terminal of the transistor 330. Referring to FIG. 4A, waveform 335 illustrates a typical incoming code. The output of the amplifier 302 is over a wire 361 which is connected to one side of a secondary winding 362 of the tuned transformer 353, the other side of the winding 362 is connected to the bus 337. The transformer 353 is inductively tuned to the center frequency of the broad band of frequencies and has characteristics so that it will pass all the frequencies included in the broad band.

The output wire 361 from the amplifier 302 is connected to the detectors 303, 304, and 306 through respective capacitors 363, 364, and 366. The high frequency detector 303, which detects the four-hundred kilocycle frequency, for example, is comprised of a series resonant circuit including capacitor 363 and a variable inductance 367, which permits tuning to this frequency. A diode 368 rectifies the voltage appearing across the inductance 367 and passes only positive going pulses to a load resistor 370. A capacitor 371 serves to maintain the amplitude of these positive going pulses. Referring to FIG. 4A, output waveform 369 illustrates the potential from the cathode terminal of the diode 368.

The center frequency detector 304, which detects the center frequency of three-hundred and ninety kilocycles for example, is comprised of a series resonant circuit including a capacitor 364 for a variable inductance 372 which is tuned to the center frequency. A diode 373, the anode terminal of which is connected to the junction between load resistors 374 and 376, rectifies the voltage across inductance 372 to pass only negative going pulses to the load resistors 374 and 376. A capacitor 377 serves to maintain the amplitude of the negative going pulses at the junction point of the load resistors 374 and 376. Referring to FIG. 4A, output waveform 375 illustrates the potential at the anode terminal of diode 373.

The low frequency detector 306, which detects the low frequencies of three-hundred and eighty kilocycles, for example, is comprised of a series resonant circuit including capacitor 366 and a variable inductance 378 which is tuned to the low frequency. A diode 380 rectifies the voltage across the inductance 378 to pass positive going pulses to a load resistor 381. A capacitor 382 maintains the amplitude of these positive going pulses. Referring to FIG. 4A, waveform 385 illustrates the potential at the cathode terminal of the diode 380.

Figure 2A:
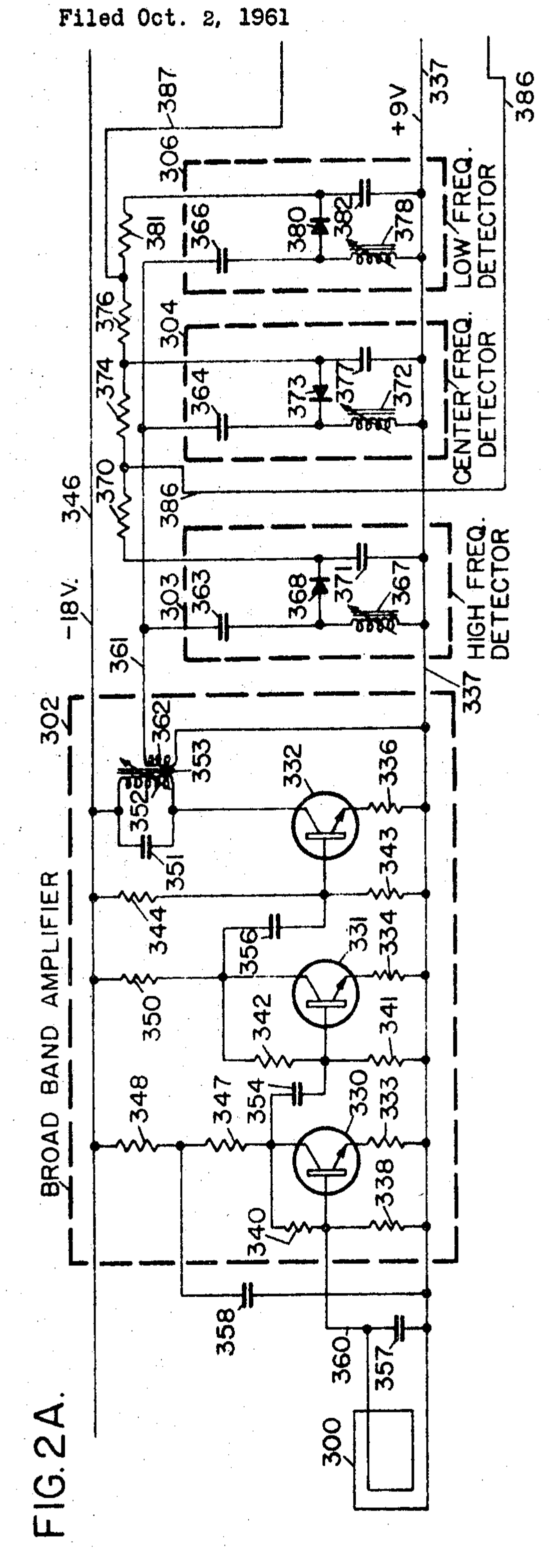
Figure 2B:
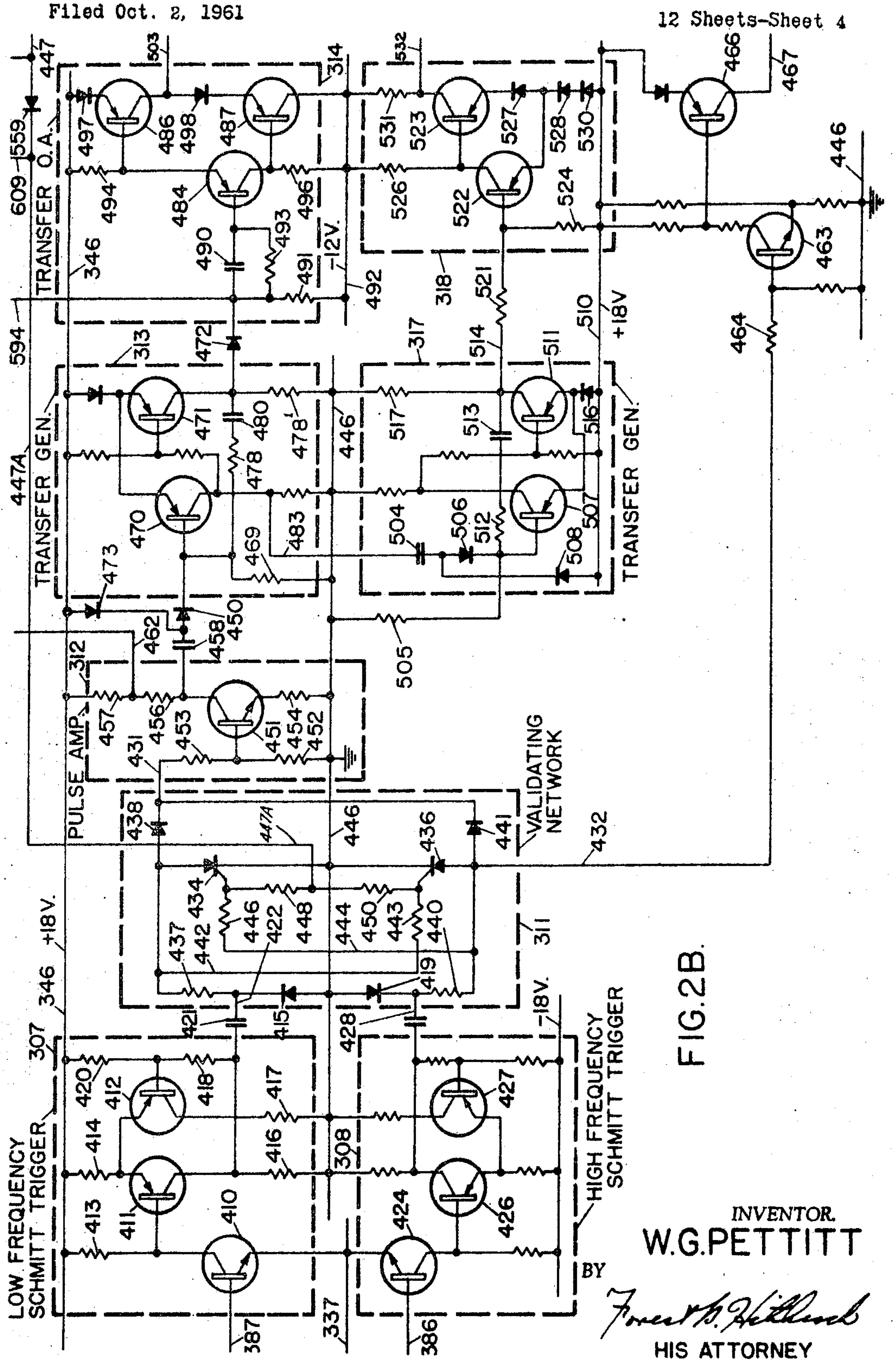
Figure 2C:
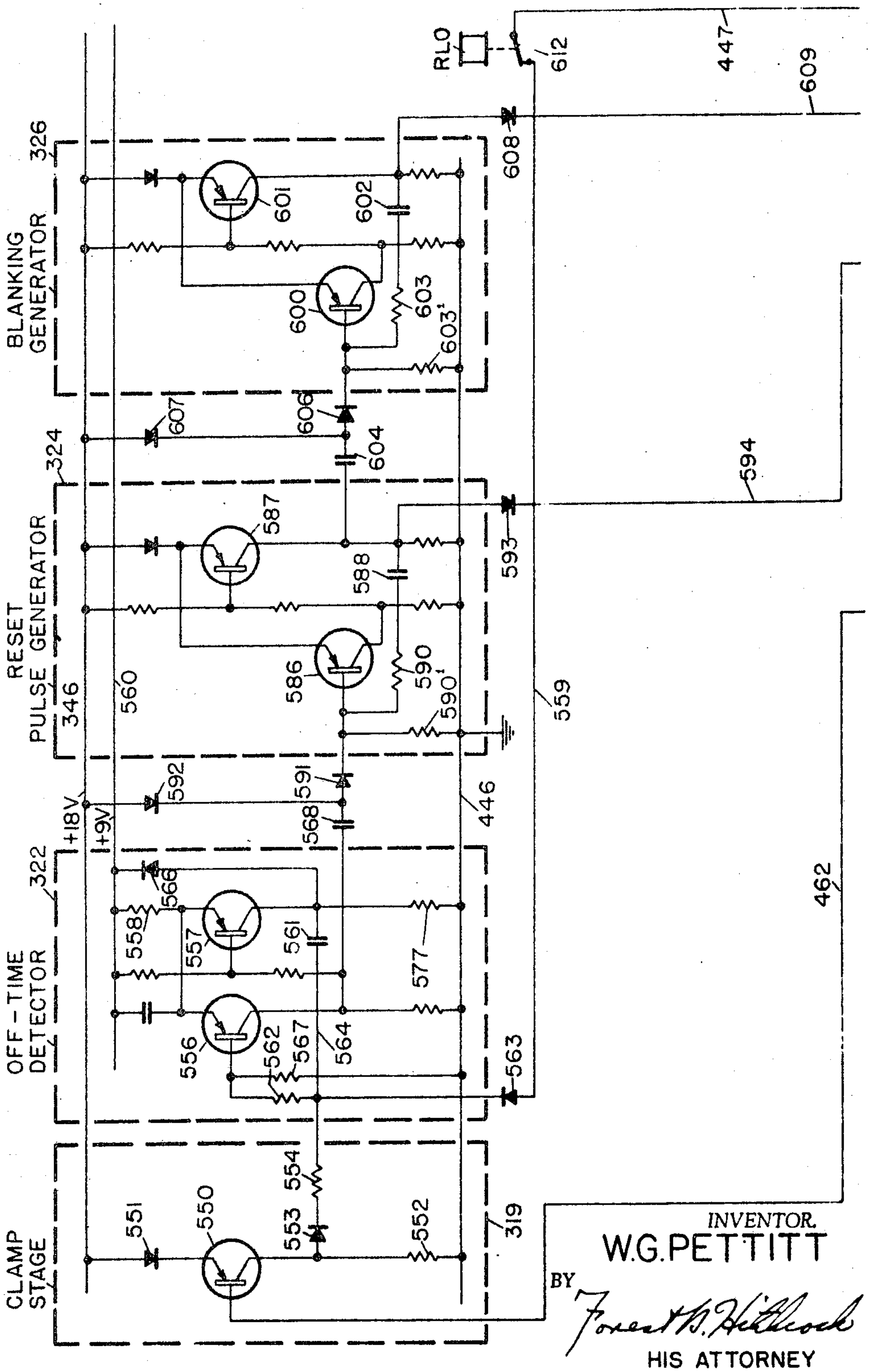

The load resistors 370, 374, 376, and 381 are all connected in series across the cathode terminal of the diode 380 of the detector 306. An output wire 386 is connected at the junction of the resistors 370 and 374; and an output wire 387 is connected at the junction of the resistors 376 and 381. The output wire 386 is connected to the input of the amplifier and trigger circuit 308; and the output wire 387 is connected to the input of the amplifier and trigger circuit 307 (FIG. 2B). Referring to FIG. 4A, waveform 389 illustrates the potential on wire 386, and waveform 395 represents the potential on the wire 387.

When a center frequency is detected, a negative potential is applied to the junction point between the resistors 374 and 376. This is represented by that portion referred to at 388 of the waveform 375. At the beginning of a high frequency, the output from the center frequency detector 304 goes to zero as shown by portion 390 of the waveform 375. At the same time the output from the high frequency detector 303 goes from zero to positive as shown by that portion of the waveform 369 referred to at 391. Therefore, because the potential on the wire 386 goes from negative to positive at the beginning of the high frequency, a steeper slope of the waveform referred to at 392 of the waveform 389 is obtained, and because of the greater excursion of amplitude, the pulse is well defined. This gives a more definite output at a distinct time to the amplifier and trigger circuit 308. At the end of the high frequency period referred to at portion 393 of the waveform 369 of FIG. 4A, the high frequency detector output goes to zero and simultaneously the center frequency detector output goes negative as illustrated by portion 394 of the waveform 375 of FIG. 4A. Thus because the potential on the output wire 386 goes from positive to negative at the end of the high frequency period, a steeper slope referred to at 396 of the waveform 389 is obtained; and because of the greater excursion of amplitude, the end of the pulse is well defined. In a similar manner the transition from a center frequency to a low frequency, referred to at portion 397 of the waveform 385 and portion 398 of the waveform 375, causes a well defined beginning and end of the low frequency pulse period, which pulse is referred to at 400 in FIG. 4A. Therefore, during a center frequency period, a negative potential is maintained on both output wires 386 and 387 connected to the trigger circuits 308 and 307 respectively. During a low frequency period the potential on wire 386 is zero and the potential on wire 387 is positive; and during a high frequency period the potential on wire 387 is zero and the potential on wire 386 is positive. The trigger circuit 307 is operated only in response to the reception of a low frequency and the trigger circuit 308 is operated only in response to the reception of a high frequency as will be described hereinafter.

Any extraneous noise picked up by the tuned loop antenna 300 is in effect cancelled out, and prevented from effecting the potential on the output wires 386 and 387 by the arrangement of the diodes 368, 373, and 380. Any noise occurring on bus 361 is rectified negatively by the diode 373, and positively by the diodes 368 and 380. This noise pulse is illustrated at 401, 402, and 403 of the waveforms 375, 369, and 385 respectively. For example, the noise pulse 401 is cancelled by the noise pulse 402 because the waveforms 375 and 369 are combined as illustrated by the waveform 389 at the input to the trigger circuit 308. The noise pulses referred to at 404 and 406 during a low frequency period are cancelled as shown by portion 400 of the waveform 395 at the input to the trigger circuit 307.

The trigger circuit 307 (FIG. 2B) which is operated by the detection of a low frequency pulse from wire 387, is comprised of an NPN transistor 410, which serves as an amplifier, and PNP transistors 411 and 412 which make up the Schmitt trigger circuit. The transistor 410, which has its emitter terminal connected to the positive bus 337 and its collector terminal connected through a resistor 413 to the more positive bus 346 is turned on by a positive pulse appearing on wire 387 connected to its base terminal. The collector terminal of the transistor 410 is connected directly to the base of the transistor 411. The emitter terminals of transistors 411 and 412 are commonly connected through resistor 414 to the positive bus 346. The collector terminals of transistors 411 and 412 are connected through respective resistors 416 and 417 to a ground bus 446. The feedback from collector terminal of the transistor 411 is returned through a resistor 418 to the base of the transistor 412. This base terminal is biased through resistor 420 by the positive bus 346. When the transistor 410 is turned on by a positive pulse, the transistor 411 is turned on, and the transistor 412 is turned off. This condition remains as long as a positive pulse appears on wire 387. The turning on of transistor 411 produces a square wave positive going output pulse through a coupling capacitor 421 to one input of the validating network over wire 422. The diodes 415 and 419 are supplied to prevent the respective input wires 422 and 428 from ever becoming negative. This input to the network 311 from the trigger circuit 307 is illustrated by waveform 423 of FIG. 4A.

The trigger circuit 308, which is comprised of the NPN amplifying transistor 424, and the transistors 426 and 427, is connected in a manner similar to the circuit 307. When a positive pulse appears on output wire 386, a square wave output appears at wire 428 connected to another input of the validating network 311. The waveform referred to at 430 of FIG. 4A represents the output from the trigger circuit 308. Thus, an output is provided from the trigger circuit 308 upon the reception of a high frequency and an output pulse is provided from the trigger circuit 307 upon the reception of a low frequency.

The validating and blanking circuit 311 provides an output pulse over wire 431 upon the reception of a positive going pulse from the trigger circuit 307 or from the trigger circuit 308 if they do not occur simultaneously. However, in the event of simultaneous occurrence of these pulses, no output is permitted over wire 431. An output from the validating circuit 311 over wire 432 occurs upon the reception of a positive going pulse from the trigger circuit 308, only if the trigger circuit 307 is not producing an output simultaneously. The output pulses over the wire 431 are shown by waveform 433 of FIG. 4A. The network 311 is comprised of silicon controlled rectifiers 434 and 436 which are non-conductive when the positive going pulses on wires 422 and 428 do not occur at the same time, whereby the positive pulse from 422 is passed through resistor 437 and the diode 438 to the output wire 431, and the positive pulse from wire 428 is passed through resistor 440 and diode 441 also to the wire 431. In the event these positive pulses occur at the same time, both rectifiers 434 and 436 conduct because the positive going pulse from the wire 422 is applied over wire 442 through resistor 443 to the gate terminal of rectifier 436; and the pulse from wire 428 is applied over a wire 444 through a resistor 446 to the gate terminal of the rectifier 434. The conducting of both these rectifiers 434 and 436 shorts the positive going inputs to ground over the bus 446. With respect to the output wire 432, the positive going pulse is passed through the resistors 440 to the wire 432. However, in the event that both rectifiers 434 and 436 are conducting simultaneously the positive output is shorted to ground over the bus 446. When a positive input is applied over wire 447 to the junction of resistors 448 and 450 both rectifiers 434 and 436 are caused to conduct when the anode potential from the trigger circuits 307 and 308 occur. This prevents an output from the circuit 311 during a resetting period which will be described hereinafter.

The pulse amplifier 312, which receives its input over wire 431 from the circuit 311, is comprised of a NPN transistor 451, the base terminal of which is connected to ground through a resistor 452 and connected to the input wire 431 through resistor 453. The emitter terminal of the transistor 451 is connected through resistor 454 to the ground bus 446. The collector terminal of the transistor 451 is connected to the bus 346 through series connected resistors 456 and 457. One amplified output from the transistor 451 is applied from the collector terminal through capacitor 458 and diode 460 to the transfer generator 313. This output is illustrated by waveform 461 of FIG. 4A. A wire 462 is connected to the junction of the resistors 456 and 457 to provide an output from the amplifier 312 to clamping stage 319 for the off-time detector 322. The output on wire 432 from the validating network 311 is connected to the base terminal of a NPN amplifying transistor 463 through a resistor 464. This transistor 463 is connected in a conventional manner to amplify the positive pulses during each high frequency period. This positive pulse causes a negative potential to be applied to the base terminal of a transistor 466 which turns on this transistor to apply an amplified positive output at its collector terminal. The collector terminal of the transistor 466 is connected to an output wire 467 leading to the shift register 316 through a resistor 468. Thus, a positive output occurs on the wire 467 to the shift register 316 during each high frequency pulse period.

The transfer generator 313 (FIG. 2B), which is a monostable multivibrator, is comprised of transistors 470 and 471. The input to the base of the transistor 470 is differentiated by the capacitor 458 and the resistor so that a sharp going positive pulse is applied to the base of the transistor 470. This sharp pulse is illustrated at 476 of a waveform 477 in FIG. 4A. This positive spike when applied to the base of the PNP transistor 470 is effective to turn it off, which turns on the transistor 471. The turning on of the transistor 471 produces a positive going pulse through diode 472 to the input of the amplifier 314. The duration of this pulse is determined by the time constant of resistors 478 and 469 in series and capacitor 480. The resistor 478 along with the collector load resistor 478′ provides a voltage dividing circuit to insure that the voltage on the collector terminal of transistor 471 will decline abruptly at the end of the pulse period. In the illustrated embodiment, a pulse width of thirty microseconds is produced which is shown at 481 of waveform 482 in FIG. 4A. The abrupt collapse through the trigger level as provided by the resistor 478′ as above described is shown at point 500. A negative going pulse from the collector terminal of the transistor 470 is applied to a wire 483 that is connected to the input of the transfer generator 317 each time the transistor 470 turns off for purposes described hereinafter.

The output from the generator 313 through the diode 472 is applied to the amplifier 314. The amplifier 314 is comprised of transistors 484, 486, and 487. The transistor 484 has its base terminal connected through a capacitor 490 and a series connected resistor 491 to a bus 492 that is connected to a negative potential such as twelve volts, for example. A resistor 493 shunts the capacitor 490. The emitter and collector terminals of the transistor 484 are connected through resistors 494 and 496 to the positive bus 346 and the negative bus 492 respectively. The positive going thirty microsecond input pulse applied through the capacitor 490 to the base of the transistor 484 turns the transistor 484 off for the duration of this pulse.

The base terminal of the transistor 486 of the amplifier 314 is connected directly to the emitter of the transistor 484; and the base of the transistor 487 is connected directly to the collector terminal of the transistor 484. The emitter-collector terminals of transistors 486 and 487 are connected in series between buses 346 and 492 in a circuit including a diode 497 and a diode 498. The amplifier 314 amplifies the thirty microsecond pulse from the generator 313 as illustrated in FIG. 4A at 501. The resistor 493 provides a more positive trigger level to the base of the transistor 484 which results in a more positive going pulse to the base of transistor 484 thus guaranteeing that the transistor 484 will be cut-off and remain off for the full pulse period. Thus, a thirty microsecond amplifier square wave pulse is produced which is referred to at 501 of waveform 502 in FIG. 4A, which pulse has a sharp cut off. This amplified square wave thirty microsecond pulse is applied to wire 503 that is connected between the collector terminal of the transistor 486 and the shift register 316. This negative pulse occurs at the end of every pulse from the output of the amplifier 312.

The transfer generator 317, which is a monostable multivibrator, is operated by the transfer generator 313 to produce a short pulse, such as twenty microseconds, for example. This pulse commences at the end of the thirty microsecond pulse previously described, and is used to complete each shifting or advancing of the shift register 316. This transfer generator 317 is comprised of PNP transistors 507 and 511. When transistor 470 of transfer generator 313 turns "on," a positive-going pulse as applied over wire 483 through a capacitor 504 and a diode 506 to the base of the transistor 507. A diode 508 has its cathode terminal connected to the junction between the capacitor 504 and the diode 506, and its anode is connected to the bus 510 which is connected to a positive potential such as 18 volts, for example. The orientation of the diode 508 eliminates any negative voltage from the junction point. The components within this transfer generator 317 are connected in a similar manner to that of the transfer generator 313. When the positive-going trailing edge of the thirty microsecond output pulse occurs a sharp positive-going trigger spike is applied to the base of transistor 507 as shown at 509 on the waveform 515 (FIG. 4A). This input positive-going trigger pulse is effective to turn "off" the transistor 507 very sharply, and when this occurs transistor 511 immediately turns "on." The turning "on" of transistor 511 immediately applies substantially plus 18 volts to the output wire 514 at the collector of transistor 511 through the emitter-collector terminals end through the diode 516 whose anode is connected to a potential of plus 18 volts. This positive potential remains on this output wire 514 for twenty microseconds, that is, until transistor 511 returns to its normal "off" condition. At the end of this period the turning "off" of transistor 511 returns the output wire 514 to substantially ground potential by way of resistor 517 and the ground bus 446. Thus, the output pulse at wire 514 is a positive-going twenty microsecond pulse which starts at the end of the negative-going thirty microsecond pulse that is generated by the transistor 470. By referring to FIG. 4A the time of occurrence as well as the general shape of this twenty microsecond pulse may be seen at reference numeral 519 on the waveform 520 (FIG. 4A). This positive-going transfer pulse is applied through an input resistor 521 to the input of an output amplifier 318.

Figure 4B:
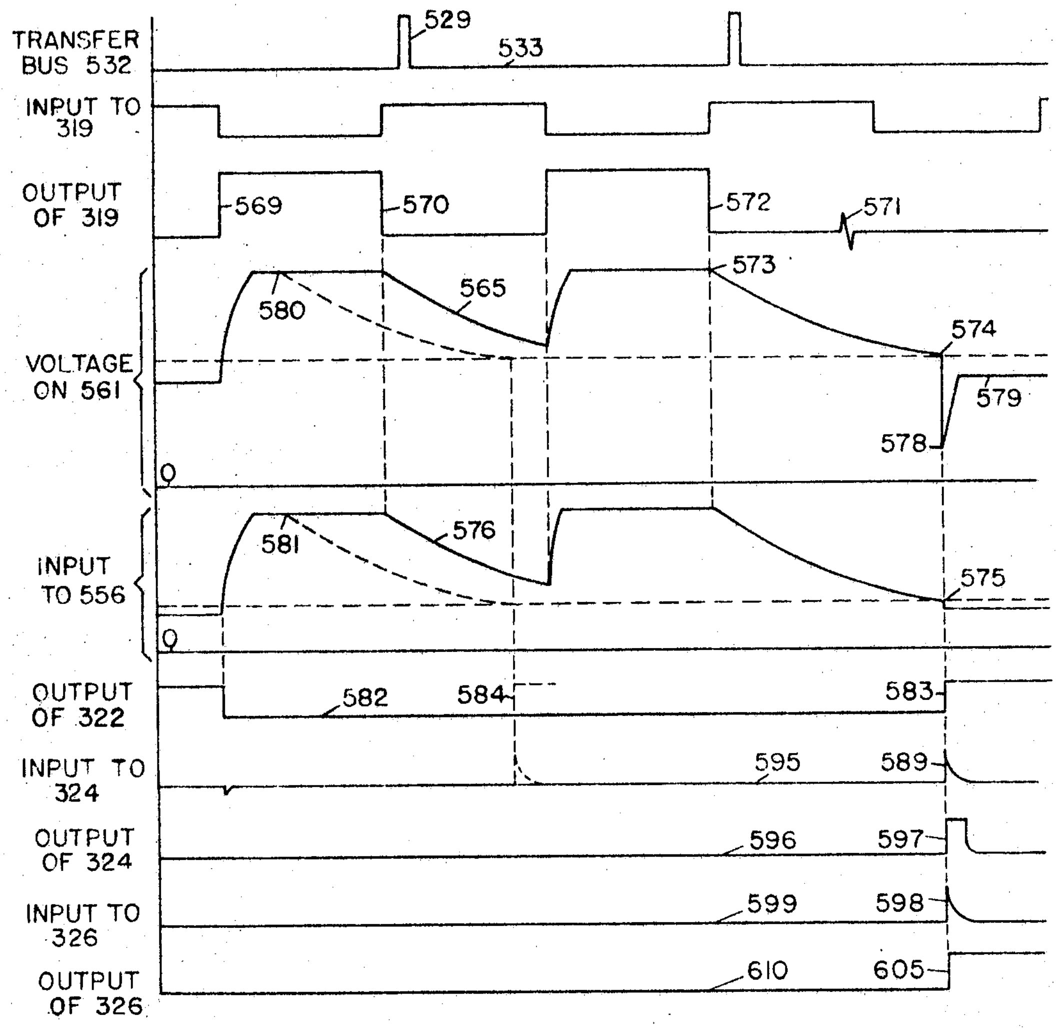
Figure 6A:
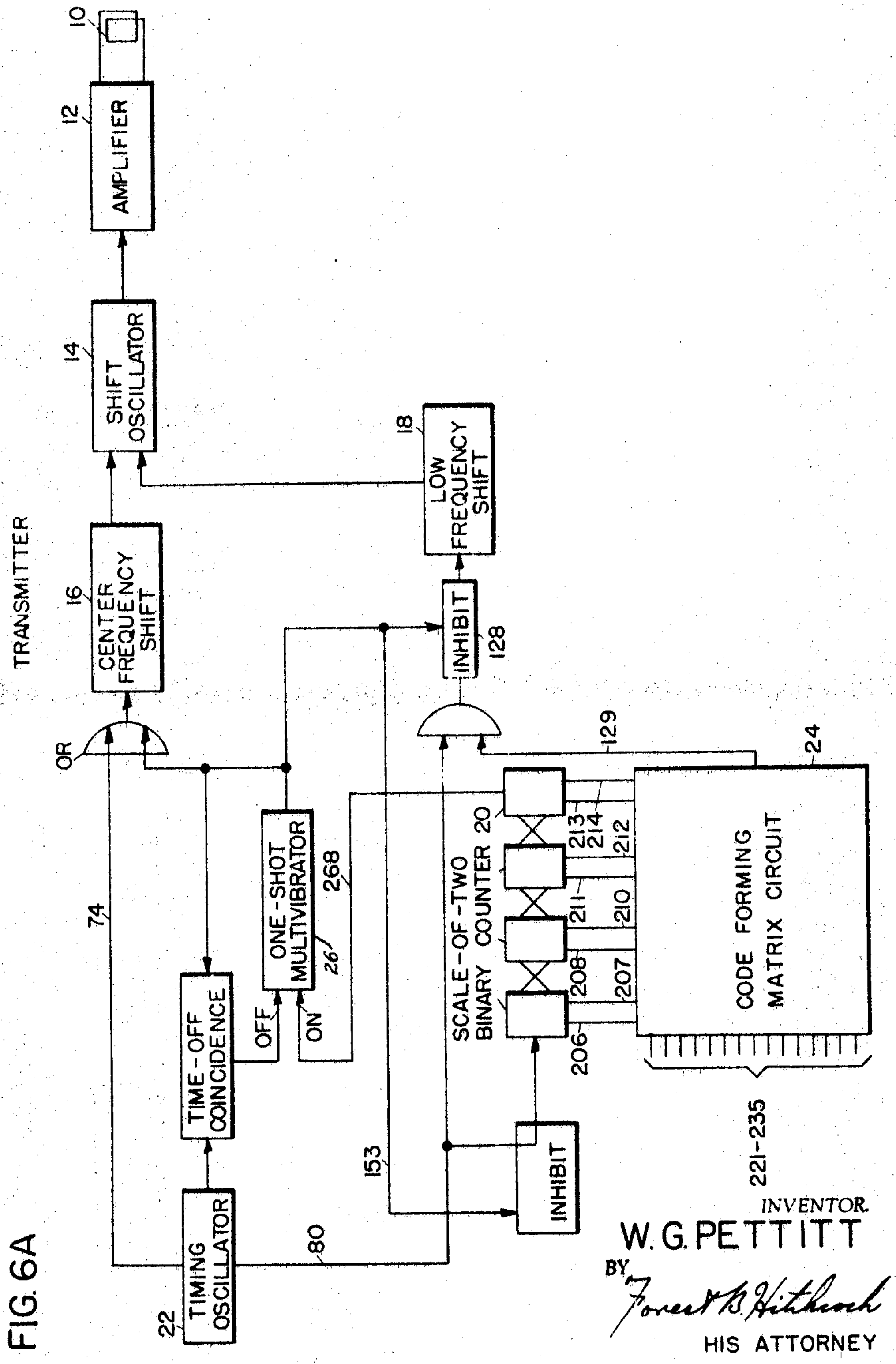
FIGS. 6A and 6B illustrate respectively in block diagram the general organization of the transmitter and receiver according to this embodiment of the invention.
Figure 6B:
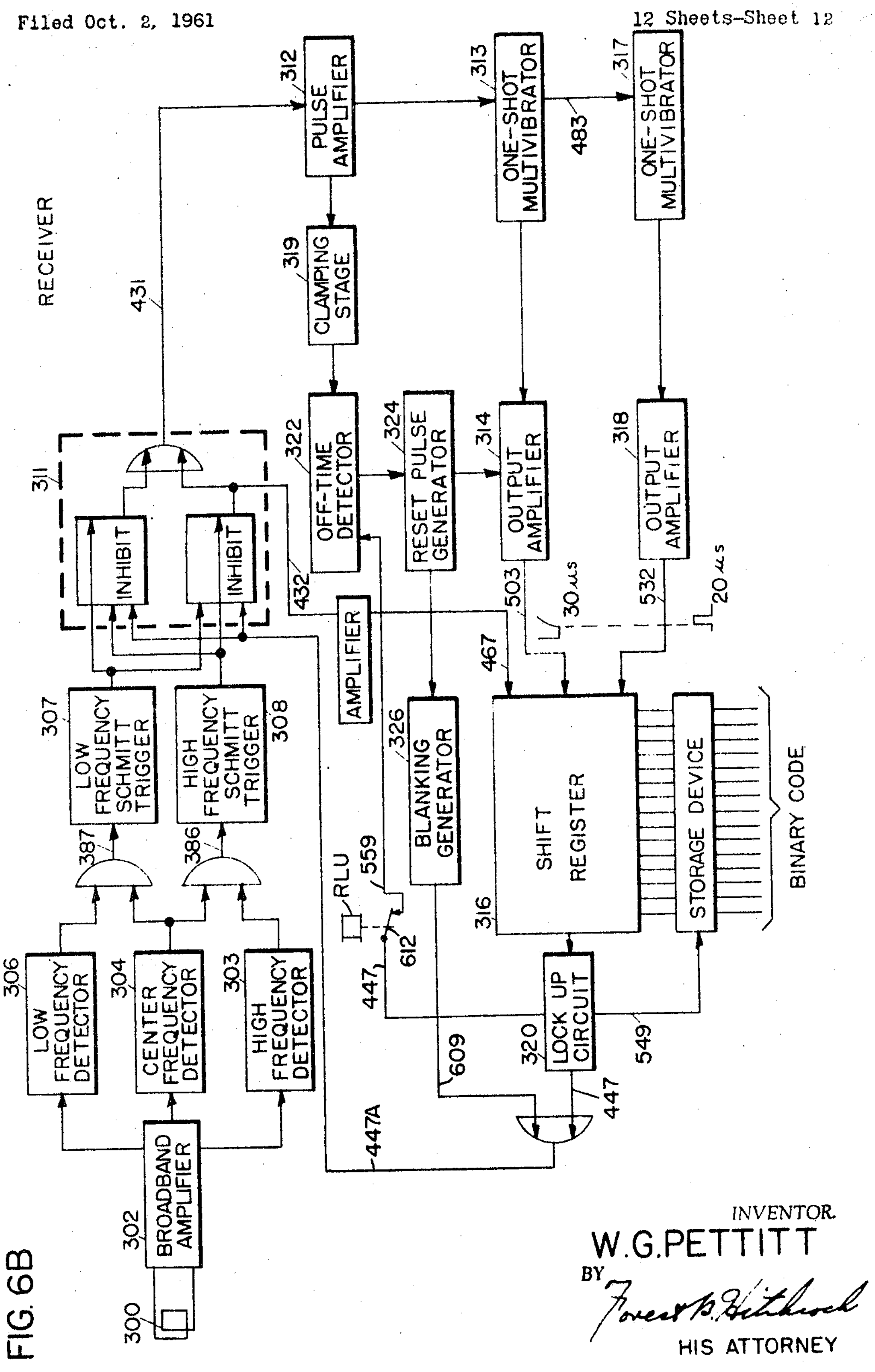

The output amplifier 318 comprises two PNP transistors 522 and 523, each of which are connected in a common emitter arrangement. The base of transistor 522 is connected through resistor 524 to the positive bus 510 and its collector connects directly to the base of transistor 523 and a resistor 526 to the negative bus 492. The emitter of transistor 523 is returned through a series of diodes 527, 528, and 530 to the positive bus 510. The emitter of the transistor 522 is connected to the junction point of the diodes 527 and 528. The collector of transistor 523 is connected through a resistor 531 to the negative bus 492, and an output wire 532. When the positive-going input pulse is applied to the base of transistor 522 from the output of the transfer generator 317, it is effective to turn "off" the transistor 522. This action causes the base of transistor 523 to go to a more negative potential because it is connected through resistor 526 to the −12 volt bus 492, hence causing this transistor to become conductive. When this occurs the output on wire 532 suddenly takes on the potential of substantially plus 18 volts because of the circuit from bus 510 through the series of diodes 530, 528, and 527 and the emitter-collector terminals of the transistor 523. At the end of the twenty microsecond input pulse when the transistor 523 turns "off," this output wire 532 returns to substantially the −12 volts level to which it is connected through resistor 531. This amplified positive-going twenty microsecond output pulse on the wire 532 is shown in FIGURE 4B at the reference numeral 529 on waveform 533.

Therefore, in accordance with the description thus far, it is apparent that the detection of a high frequency determines the potential of the wire 467 leading to the shift register 316. The duration of this potential corresponds to the length of the high frequency pulse period, which in this embodiment, is two-hundred fifty microseconds. At the beginning of the period, following a high or low frequency, that is, when a center frequency is being received, first a thirty microsecond negative pulse is applied to the shift register over wire 503, and immediately upon cessation thereof, a twenty microsecond positive pulse is applied to the shift register over wire 532. The potential on the wire 467 reads each bit of information into the shift register 316 and the subsequent thirty and twenty microsecond pulses shift the register so that the succeeding high or low frequency in the cycle conditions the shift register in accordance with the code.

Figure 2D:
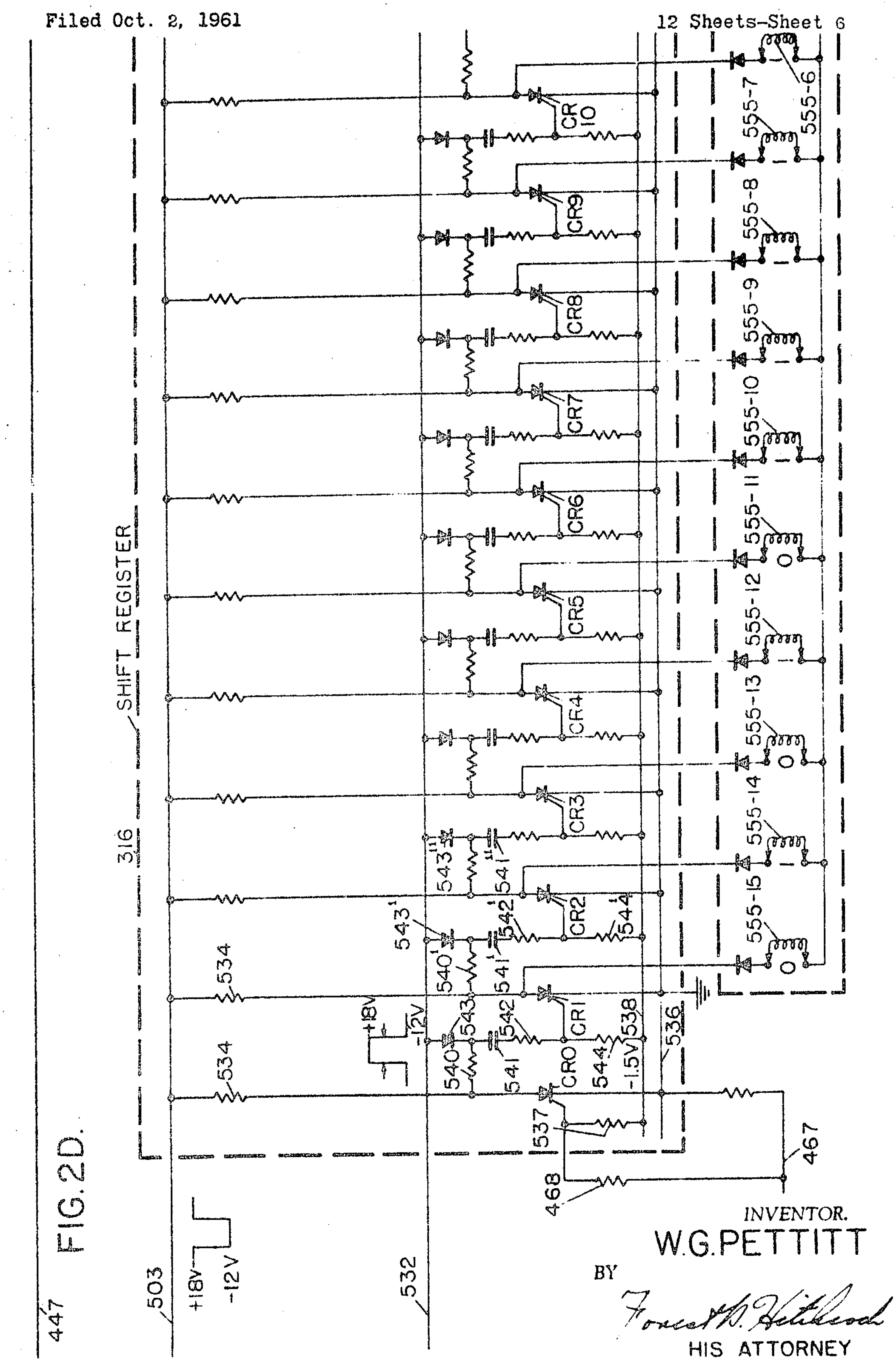
Figure 2E:
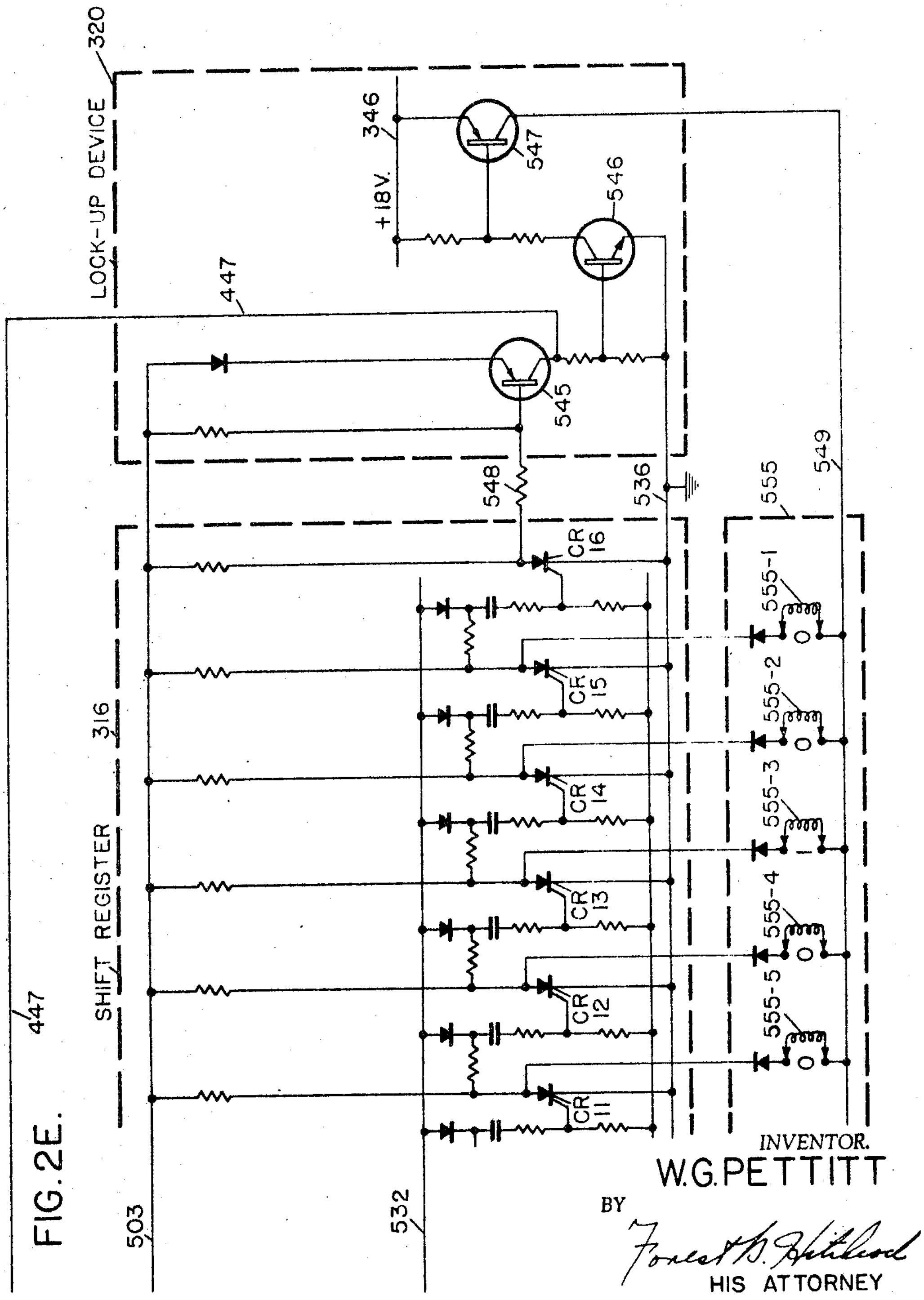

The shift register 316 shown in FIGS. 2D and 2E is comprised of a plurality of stages, the number depending on the number of digits in the transmitted code plus one. The extra stage serves as an input stage to the remaining stages of the shift register. In this embodiment, the code cycle is comprised of sixteen digits, and each stage of the shift register is provided to store one of the digits of a code cycle. As each digit is sequentially received, it is transferred from the input stage to the next following stage. Upon completion of a code cycle, the stages of the shift register 316 are filled with the binary code and the shift register becomes "locked up." The data may then be used in any conventional manner in accordance with the requirements of practice.

The input stage of the shift register is comprised of a silicon controlled rectifier CR0, having an anode terminal connected through a resistor 534 to the 503 bus, and a cathode terminal connected to ground bus 536. The gate terminal of the silicon controlled rectifier is connected through resistor 537 to bus 538 having a negative potential of −1.5 volts, for example, applied to it. This negative potential on the gate is effective to maintain the silicon controlled rectifier in a nonconductive state unless otherwise overcome by a positive potential applied thereto. The anode terminal is also connected to a current limiting resistor 540, the other side of which is connected to a capacitor 541. The capacitor 541 is connected through a resistor 542 to the gate terminal of the next stage that includes rectifier CR1. The resistor 541 has a value large enough to prevent a positive pulse from the anode of CR0, for example, from reaching the gate terminal of CR1. The capacitor 541 provides a temporary storage for the binary data between stages. A diode 543 allows a positive potential to be applied from the transfer bus 532 to capacitor 541 to charge it positively as required.

The operation of each stage, which includes one of the rectifiers CR0 through CR16 consecutively is similar. When the system is turned on the capacitors such as 541, 541' etc., one of which is included in each stage, are charged to a positive potential on their upper plate because they are connected through resistors such as 540 and 534 in series to the bus 503 from the output of the amplifier 314. Since the transistor 486 is normally conductive the +18 volts from bus 346 is applied through diode 497 and the transistor to the bus 503. The lower plates of the capacitors such as 541, and 541' are connected through resistors, such as 542 and 544, and 542' and 544', to bus 538 that is connected to a negative potential, such as minus one and one-half volts, for example. The gate of the silicon controlled rectifier CR1 has this negative potential applied thereto because it is connected to the junction of resistors 542 and 544. All the other silicon controlled rectifiers are connected in a similar manner, therefore, this negative potential insures that the silicon controlled rectifiers CR0 through CR16 will not conduct, unless this negative potential is overcome by some positive potential.

The first digit received of the code cycle is a high frequency and is referred to in this embodiment as the zero digit. The zero digit is not actually part of the binary coded information but serves to "lock up" the information in the shift register at the end of a cycle. All other following digits are either a low or a high frequency in accordance with the code.

As heretofore explained, a positive pulse is applied to the wire 467 and through the resistor 468 to the gate terminal of the input silicon controlled rectifier CR0 during a high frequency pulse period only. At the beginning of the code cycle, the zero digit causes the rectifier CR0 to conduct thus dissipating the charge on the capacitor 541 through the current limiting resistor 540. This conduction continues until the end of the zero digit or for approximately two-hundred fifty microseconds. The application of the thirty microsecond pulse then causes the bus 503 to go negative for this length of time. A certain minimum positive current is required for maintaining a silicon controlled rectifier conductive, but the anode of the rectifier CR0 herein is actually driven to a negative potential to insure that the silicon controlled rectifier CR0 turns off abruptly. At the end of the thirty microsecond period the transfer 503 is restored to its original positive potential of substantially plus 18 volts thereby reapplying the anode potential to all the silicon controlled rectifier anodes. This restoring of the anode potential will not cause any of the silicon controlled rectifiers to conduct, but merely prepares each of them for their next conductive period.

Simultaneously, at the end of the thirty microsecond pulse as hereinbefore described, the twenty microsecond pulse is applied through the capacitor 541, it is limited in amplitude by the resistor 542 so that not too great a peak current is applied through the gate of the silicon controlled rectifier CR1. At the same time the resistors 542, 542', etc. supply sufficient current flow in the circuits to guarantee the firing of the silicon controlled rectifiers whose gate connected capacitors 541, 541', etc., respectively have been formerly discharged.

The application of the twenty microsecond pulse to the bus 532 is applied to the gate terminal of the silicon controlled rectifier CR1, thereby causing it to conduct. The conducting of the rectifier CR1 discharges the capacitor 541' through the resistor 540' to the ground bus 536. The positive anode potential to the rectifier CR1 at this time is applied from the bus 503 through the resistor 534'. It is apparent at this time that the rectifier CR1 is rendered conductive because the rectifier CR0 in the previous stage of the shift register was previously conducting. Thus, in effect a transfer of the condition of one silicon controlled rectifier to the next is completed immediately following the reception of each high or low frequency of the cycle. It should be noted that the transfer of the condition of each rectifier CR to the next succeeding rectifier CR occurs during the first portion of the time allotted to the transmission of a center frequency. All of the stages except the first have a remaining period of approximately 450 microseconds before the start of the next transfer period; consequently, any capacitor, such as 541'', 541', etc. which require discharging will have sufficient time to do so. In the case of the first stage the time allotted to discharge the capacitor 541 must be approximately 125 microseconds as limited by the acceptability of a half pulse width in the system.

In summary, just prior to the beginning of a code cycle, all the silicon controlled rectifiers CR0 through CR16 are nonconducting and the capacitors such as 541 and 541' etc. are fully charged. A positive voltage is present on the bus 503 and a negative voltage is present on the bus 532. At the beginning of the zero digit of the cycle a positive pulse is applied to the gate of CR0. This causes CR0 to fire and the charge on the capacitor 541 is bled off through the resistor 540. The rectifiers CR1 and CR2 will remain nonconducting and the capacitors 541' and 541'' will maintain their full charge. Upon the reception of the thirty microsecond pulse the voltage on the bus 503 becomes negative and the rectifier CR0 turns off. The restoration of the positive voltage to the bus 503 at the end of the thirty microsecond pulse begins to charge the capacitor 541 and the rectifier CR0 remains off. Upon the restoration of the bus 503 to its positive potential, the positive twenty microsecond pulse causes the diode 543 to conduct and the rectifier CR1 turns on. The following stages remain in their off condition because the diodes such as 543′ and 543″ are blocked for current conduction by the charge on their respective capacitors 541′ and 541″.

If, during the next pulse period a low frequency is received, the rectifier CR0 will remain off and the capacitor 541 will remain charged. At the time of transfer CR0 will remain off, CR1 will be turned off, and CR2 will be turned on. Thus, the "on" condition is transferred through the register until the completion of sixteen shift pulses. The high frequency condition originally entered in CR0 will be in CR16 and the highs which have been read in during the time between shifts will occupy locations in the register depending on the time at which they were read in.

At the end of the code cycle a so-called "lock-up" devise 320 serves to permanently store the information contained in the shift register. The apparatus 320 is a switching device which provides a potential for completing a circuit to the storage devices such as relays or the like. One of these storage devices is associated with each stage of the shift register and they are referred to at 555–1 through 555–15.

The lock-up device or apparatus 320 is comprised of a PNP transistor 545, an NPN transistor 546, and a PNP transistor 547. When the shift register 316 is filled as determined by the conduction of the rectifier CR16, an output of substantially ground potential is applied to the resistor 548 connected to the base terminal of the input transistor 545. This causes 545 to conduct which, in turn, causes the transistor 547 to conduct. The conduction of the transistor 547 permits the application of a positive potential, such as 18 volts for example, from the bus 346 to be applied to the wire 549. Thus, the apparatus 320 is substantially a switching device which turns on at the end of a properly completed code cycle.

The operation of the lock-up apparatus 320 also applies a positive potential to the bus 447 that is connected through a diode 559 and over wire 447A to the junction between the resistors 448 and 450 of the validating network 311. This positive potential applied upon the operation of the device 320 prevents any further output to the pulse amplifier 312 and to the shift register 316 because of subsequently received code cycles. The conduction of the transistor 547 completes a circuit through all of those rectifiers CR1 through CR15 which are conducting to energize the storage devices 555–1 through 555–15 respectively. Thus, it is the combination of the energized or deenergized condition of these storage devices at the end of the cycle which represents the binary code.

The lock-up device 320 when turned on at the completion of a code cycle also applies a positive potential over the bus 447 through a back contact 612 on the RLU relay (release lock-up) to a wire 559 connected to the off-time detector 322 to prevent the reset pulse from being generated by the pulse generator 324 as will hereinafter be described. A relay such as RLU (FIG. 2C) is used to momentarily open the lock-up bus so that the shift register 316 is reset and a subsequent code may be read in to the shift register 316. This relay may be operated in any well known manner either through code communication or direct wire.

The shift register 316 is cleared by the application of a thirty microsecond pulse to the bus 503 from the output amplifier 314 which is caused by positive energy being applied to a wire 594 (FIG. 2C) from the reset pulse generator 324, without the following twenty microsecond pulse which occurs during the normal cycle. The absence of the twenty microsecond pulse prevents any of the silicon controlled rectifiers CR0 through CR16 from being turned on. Thus, all the capacitors such as 541, 541′ etc. are fully charged and all the rectifiers CR0 through CR16 are off. The clearing of the shift register also turns off the lock-up device 320.

The off-time detector 322 which has a clamping stage 319 is provided to detect a pulse width of less than one hundred twenty-five microseconds duration or a missing pulse in the code cycle. The input to the clamping stage 319 from the pulse amplifier 312 is a series of negative square wave pulses which occur for each digit of the cycle. These square wave pulses are applied over wire 462 to the base terminal of transistor 550. The emitter terminal of the transistor 550 is connected to the bus 346 through a diode 551. The collector terminal of the transistor 550 is connected through a resistor 552 to the ground bus 446 and is also connected to a diode 553 which is oriented to pass positive pulses. A resistor 554 is connected to the diode 553 and is connected to the input of the off-time detector 322. The clamping stage maintains a positive potential on the input to the off-time detector 322 for the duration of each pulse period. The transistor 550 turns on upon the conduction of the transistor 451 of the pulse amplifier 312. Thus, substantially an 18 volt potential is applied on wire 564 each time the transistor 550 conducts to maintain the left side of a capacitor 561 as viewed in the drawings at substantially this potential.

The off-time detector 322 which is a monostable multivibrator is comprised of PNP transistors 556 and 557. The emitters of these transistors are connected to bus 560 through the common emitter resistor 558. The feedback circuit for controlling the timing in this circuit, which is approximately three-hundred seventy-five microseconds for example is comprised of the capacitor 561 and the resistor 562 connected in series from the collector of the transistor 557 to the base of the transistor 556. A diode 566 is connected between one side of the capacitor 561 and the collector terminal of the transistor 557 so that the right side of the capacitor 561 as viewed in the drawings cannot become more positive than the 9 volts, for example, as applied to the bus 560. During the reception of a code cycle the start of an input pulse to the clamping stage 319 charges the capacitor 561 through a circuit from bus 346, through a diode 551, the emitter-collector terminals of the transistors 550, diode 553, resistor 554, through the capacitor 561 and through the diode 566 to the bus 560. The positive potential developed on the base of transistor 556 by this circuit is sufficient to cause the transistor 556 to cut off. Thus, in a conventional manner the transistor 557 turns on at the same time. This action further maintains the right side of capacitor 561 at the nine volt level by a circuit through the resistor 558 and emitter collector terminal of the transistor 557. As long as the clamping stage 319 remains on, which is during the pulse period, a positive 18 volt potential is applied to the wire 564. At the end of the pulse period when the clamping stage again becomes nonconductive, the junction point 564 will begin to decay toward ground potential through the resistors 562 and 567. As this occurs the base of the transistor 566 becomes less positive. However, because of the time constant the next negative-going output pulse occurs on wire 462 and again triggers the clamping stage 319 to recharge the capacitor 561 before the off-time detector can again turn on. Thus, the proper reception of each pulse of the cycle maintains the transistor 556 of the off-time detector nonconductive.

Since the blanking period is a center frequency of extended length it is sensed as an omission of a series of pulses. Under these circumstances when the capacitor 561 does not become recharged by the closely spaced pulses it continues to become less positive at the junction point 564 until the voltage at the base of the transistor 566 is below the trigger level. Under these circumstances the transistor 556 is turned on and a positive potential is applied to the coupling capacitor 568 connecting the off-time detector to the reset pulse generator 324. In FIG. 4B a waveform 565 represents the charge on the capacitor 561 at its side toward the wire 564. The commencement of the code period is referred to at 569 of waveform 570 of FIG. 4B. A missing pulse period or break in time is represented at 571 in the waveform 570. Assuming, for example, the trailing end of the final pulse represented at 572 of FIG. 4B is the last pulse in a cycle then the subsequent time represents the blanking period up to the time of the beginning of the first pulse represented at 569. The exponential decay of the charge on the capacitor 561 begins at point 573 on waveform 565 and after approximately three-hundred seventy-five microseconds it falls below some predetermined value, for example, 10.5 volts, at point 574 on the wire 564. At the same time the potential on the base of transistor 556 falls below its own emitter voltage level at point 575 on waveform 576 of FIG. 4B which represents this base potential. When the transistor 556 becomes conductive after the elapse of three-hundred seventy-five microseconds, the base of the transistor 556 saturates suddenly and discharges the capacitor 561 through resistor 562 and the resistor 577 to the ground bus 446. This sudden discharge of the capacitor 561 is illustrated by the sudden drop toward ground potential at point 578 of waveform 565 in FIG. 4B. The output waveform of the transistor 556 is referred to at 582. Thus, approximately three-hundred seventy-five microseconds after the blanking period begins or at point 583 of the waveform of FIG. 4B, the off-time detector 322 produces a positive-going pulse.

At the portion referred to at 580 of waveform 565 the dash line represents the potential on wire 564 in the event of too short a pulse, and the corresponding portion referred to at 581 on the waveform 576 indicates the condition of the base of the transistor 556. Thus, 375 microseconds after the end of a short pulse, the transistor 556 will turn on and produce a positive-going pulse. This positive-going pulse is referred to at point 584 in the waveform of FIG. 4B.

The output from the off-time detector 332 is applied through the capacitor 568 and a diode 591 to the reset pulse generator 324. The reset pulse generator 324 is comprised of PNP transistors 586 and 587 that are connected as a monostable multivibrator. The time constant of this multivibrator is controlled by the network that includes a capacitor 588, a resistor 590 and a resistor 590', and is the same as that of the transfer generator 313, that is, thirty microseconds. The positive input to the generator 324 is differentiated by the capacitor 568 and the value of the resistor 590'. This positive spike is represented by portion 589 of the waveform 595 of FIG. 4B. The diode 592 prevents the junction of capacitor 568 and diode 591 from going more negative than the 346 bus. Thus, a positive-going pulse of thirty microseconds duration, which is illustrated by pulse 501 in the waveform 502 of FIG. 4A is applied to the bus 503 (FIG. 2D). This positive-going pulse, which occurs approximately three-hundred seventy-five microseconds after the end of the last pulse clears the shift register 316 of all data stored therein. It should be noted, that if a pulse is too short or missed during a code cycle and before the shift register is completely filled, a reset will occur to clear the shift register so that a subsequent cycle is received effectively. It should be recalled in the event of the reception of a complete code cycle, the shift register 316 cannot be cleared because of the operation of the lock-up apparatus 320.

The blanking generator 326 is comprised of PNP transistors 600 and 601 which are connected as a one shot multivibrator having a substantially long time constant. This time constant is determined in the usual manner by the value of the capacitor 602 and the resistors 603 and 603'. The normal condition of the transistor 600 is conductive. It is forced into nonconduction whenever a positive-going pulse is applied through the capacitor 604 and the diode 606 to its base terminal. A diode 607 is connected from the bus 346 to the junction of the capacitor 604 and resistor 606 to prevent this junction from becoming more negative than bus 346. The function of turning off the transistor 600 occurs whenever a positive-going pulse is applied to the reset generator 324, for at this time transistor 586 is turned off and transistor 587 is turned on simultaneously thereby providing the positive-going pulse to the blanking generator 326. Like the usual multivibrator when transistor 600 is made nonconductive the transistor 601 becomes conductive. This in turn supplies a positive-going pulse on the collector terminal of transistor 601 which is applied through diode 608 and over the wire 609. This positive-pulse when applied to the junction of the resistor 448 and 450 over wire 447A is effective to gate the silicon controlled rectifiers 434 and 436 into conduction thereby shorting out any additional input pulse to the system. The blocking of further input pulses is essential because if an incomplete or defective code were received, the shift register 316 would become reset by the reset generator 324, and consequently any additional input pulse at the trailing end of a code cycle would also supply a defective code. The time constant of this blanking generator 326 may be made just somewhat less than the length of the blanking period less approximately 375 microseconds which is the approximate discharge time of the off-time detector 322. One criterion is that the length of this period will be just slightly less than the aforementioned calculated period so that the blanking generator 326 will be reinstated to its normal condition before the start of the first pulse in the next code cycle. This is essential so for a short period during the blanking interval the silicon controlled rectifier 434 and 436 will be allowed to become nonconductive so that incoming pulses may be passed through the system.

The output waveform 596 of FIG. 4B shows the positive-going 30 microsecond pulse at 597 which is generated by the reset generator 324. The positive-going front of the pulse 597 is differentiated by the coupling network 604 and 603' hereinbefore described and appears as the spike shown at 598 in the waveform 599. As a result of this positive-going pulse 598 the blanking period is initiated as designated at the point 605 in waveform 610. The turning off point of the blanking generator 326 is not shown in the waveform but as stated previously the time during which it remains on must be somewhat less than the remainder of the blanking period after the time period of the off-time detector 322 has been subtracted therefrom.

According to actual practice, a system of the type herein illustrated and described was effective to cause the proper transmission and reception of a complete cycle of information between a train moving at eighty-five miles per hour and a wayside location. Although, the illustrated embodiment was described in connection with the transmission and reception of information such as train identification, speed and power condition, it is to be understood that any type of information may be transmitted.

Having described a code communication system according to one specific embodiment, it is to be understood that various modifications, adaptations and alterations may be made without departing from the spirit or scope of the present invention.

What I claim is:

1. A system for communicating between a moving object and a fixed wayside location a distinct complete cycle of information comprised of a predetermined number of spaced binary digits and wherein said system a transmitting and receiving antenna is so constituted and positioned on the object and at the fixed location as to be operatively coupled in spaced relation momentarily, comprising:

(1) a transmitting and receiving means connected to each respective antenna to transmit and receive the binary digits, (2) said transmitting means comprising, (a) means to transmit repetitively a distinct binary code cycle having a predetermined number of spaced digits with each digit being a selected one of two frequency shifts occurring at predetermined spaced time intervals and for a predetermined time duration, (b) circuit means responsive to the completion of one distinct cycle to delay for a predetermined time interval the transmission of the next subsequent cycle, said interval of time being greater than the time interval between the end of one digit of a cycle and the end of the next subsequent digit, (c) means including the delay circuit means to select a same predetermined one of the frequency shifts for the first digit of each repetitive cycle, (3) said receiving means comprising (d) means to detect each selected frequency for each digit of a cycle, (e) a shift register having stages for storing each digit of a code cycle with a first stage for storing the binary information corresponding to the detected frequency shift and means for shifting the stored binary information from one stage to the next succeeding stage, (f) first timing means operated to cancel the information stored in the shift register stages upon the failure of the detecting means to detect the presence of a frequency shift digit during a first time interval corresponding to the predetermined spaced time interval between transmitted digits, (g) second timing means responsive to the operation of the first timing means at the end of the first time interval to render the shift register unresponsive to a received frequency shift digit for a second time interval to complement the first time interval, said first and second time intervals in the aggregate corresponding to a duration slightly less than the interval of time between the end of transmission of one complete cycle and the beginning of the transmission of the next complete cycle, and (h) circuit means responsive to the storage of binary information in the last stage of the shift register corresponding to the same predetermined frequency shift of the first transmitted digit of a cycle to store permanently the complete binary code cycle and to render the shift register unresponsive to subsequently received digits.

2. A system as claimed in claim 1 wherein the means to transmit repetitively a distinct code cycle includes: an oscillator operative alternately to one and the other of two conditions, said oscillator including means to select one of the two frequency shifts for each digit corresponding to the binary code to be transmitted upon each operation of the oscillator to its one condition, and a bistable counter responsive to each operation of the oscillator to its one condition to count a digit of the cycle, and wherein said systems the circuit means to delay the transmission of a subsequent cycle includes means to select the same predetermined digit of the cycle upon the operation of the oscillator to its one condition at the end of said predetermined time interval and governs the counter to start counting each digit upon the operation of the oscillator to its one condition following the selection of the first digit.

3. A system as claimed in claim 2 wherein the oscillator is a free-running oscillator and said delay circuit means includes a one-shot multivibrator operated during said time interval between cycles and operatively connected in the transmitting means to render the transmitting means ineffective to transmit either one of the two frequency shifts and operatively connected to the oscillator to synchronize the end of said time interval with the operation of the oscillator to its one condition.

4. A system for communicating between a moving object and a fixed wayside location a distinct cycle of information comprised of a predetermined number of spaced binary digits and wherein said system a transmitting and receiving antena is so constituted and positioned on both the object and the fixed location as to be operatively coupled in spaced relation momentarily, comprising:

(1) a transmitting and receiving means connected to its respective antenna to transmit and receive the binary digits, (2) said transmitting means comprising:

(a) a storage means having a plurality of inputs for storing in parallel form a number of discrete bits of binary information, (b) oscillating means operating alternately to a first and second condition, at a substantially constant repetition rate, (c) frequency generating means connected to the oscillating means operative to select for transmission a first frequency upon each operation of the oscillating means to its second condition and a selective one of a second and third frequencies corresponding to a binary bit upon each operation of the oscillating means to its first condition, (d) counting means activated in response to each operation of the oscillating means to its first condition and connected to the frequency generating means to control the storage means to select for transmission each stored binary bit in a predetermined succession, (e) timing means operated in response to a predetermined number of activations of the counting means by the oscillating means to control the frequency generating means to select for transmission the first frequency for a predetermined time corresponding to the time for transmitting a plurality of bits, (f) means including the timing means and the oscillating means to control the frequency generating means to select for transmission the second frequency at the end of said predetermined time, and to render the counting means inactive for transmission of said second frequency upon operation of the oscillation means to its second condition, (3) said receiving means comprising:

(g) detecting means operative to detect the reception of the first, second and third frequencies, (h) a shift input means and shift register having a plurality of stages, operative to transfer binary information from one stage to its next succeeding stage in response to a distinctive activation of its shift input means and to store binary information in a first stage, (i) first circuit means connected to the first stage responsive to the detection of a second or third frequency to store the binary bit in the first stage, (j) second circuit means, including the first input means when activated in response to the detection of each second and third frequency to shift the binary information from one stage to its next succeeding stage subsequent to the storing of each binary bit in the first stage, (k) first timing means connected to the detecting means operated to cancel binary information stored in the shift register when either a second or third frequency is undetected for a predetermined time greater than the normal time duration between the transmission of each second or third frequency, (l) a second timing means responsive to the operation of the first timing means to render the shift register unresponsive to any second and third frequencies for a time interval just less than a duration of time corresponding to the time between transmitted cycles less the time interval of the first timing means, (m) and means responsive to the storing of the binary bit in the last stage of the register corresponding to said second frequency to render the shift register unresponsive to the reception of subsequent bits, (n) whereby a complete distinct binary cycle is effectively received at the receiving location only when the first bit is of a distinct character and the remaining bits occur for a duration of time to not operate the first timing means of the receiving means thereby insuring that each digit of the cycle is of the proper duration and spacing and the predetermined number has been received.

5. A frequency shift transmitter for transmitting repetitively distinct cycles of binary information with each cycle comprised of a predetermined number of information digits of a predetermined duration, comprising a frequency shift means for transmitting selectively when activated a first or second frequency, an oscillator operative alternately to a first and second condition connected to the frequency shift means to control the transmission of a selected first or second frequency upon each operation of the oscillator to its second condition, a bistable counter connected to the oscillator to count each operation of the oscillator to its second condition, said counter being operated to a different condition in sequence corresponding to the number of digits in a distinct cycle upon each operation of the oscillator to its second condition, encoding means responsive to each distinctive condition of the counter to govern the selection of a first or second frequency upon each operation of the oscillator to its second condition, a timing circuit means responsive to one distinct condition of the counter to render the frequency shift means ineffective to transmit a selected first or second frequency for a predetermined time interval and to hold the counter in one condition for said predetermined time interval and an additional time interval less than the duration of one digit, means connected to the oscillator and the timing circuit means to control the frequency shift means to transmit a first frequency and end said predetermined time interval upon the operation of the oscillator to its second condition, whereby the first digit of each cycle transmitted is always the first frequency and the counter is operated to each next distinctive condition to govern the encoding means to select a first or second frequency for the subsequent digits of the cycle in sequence.

6. A transmitter as claimed in claim 5 wherein the oscillator is a free-running oscillator operating to its first and second condition during said predetermined time interval and said timing circuit means synchronizes the end of said time interval with the operation of the oscillator to its second condition to count effectively a predetermined number of operations of the oscillator between distinct cycles.

7. In a frequency shift transmitter for transmitting repetitively a plurality of distinct cycles of binary information with each cycle comprised of a predetermined number of information digits and wherein each information digit is a first or second frequency shift and said transmitter further comprises a code forming circuit and a counter wherein a selected one of the first and second shift frequencies is transmitted upon each activation of the counter in accordance with the information in the code forming circuit, comprising a timing oscillator operative alternately to a first and second condition, circuit means including the counter and the code forming matrix to govern the selection of a first and second frequency upon each operation of the oscillator to its first condition, timing circuit means governed by the counter to operate from a normal to an active condition in response to a predetermined number of operations of the oscillator to its second condition while the timing circuit is in its normal condition, inhibit circuit means responsive to the activation of the timing circuit means to block the transmission of the first and second frequencies for a predetermined time interval corresponding precisely to a predetermined number of operations of the oscillator to its second condition, and means governed by the timing means and oscillator to transmit a first frequency at the completion of said time interval and to delay the activation of the counter until the selection of the second digit of the cycle to govern the selection of the first and second frequencies.

8. A receiving apparatus for storing in parallel form a distinct cycle of information comprised of a plurality of serially received spaced binary digits with each digit being a first or second frequency shift, from a transmitter having an antenna which is momentarily in operative relationship to the antenna of the receiving apparatus which transmitter transmits repetitively distinct cycles of binary digits each digit of which is of a first predetermined time duration and spacing with another predetermined time between each distinct cycle to separate the transmitted cycles and the first digit of each cycle being of the first frequency shift, said receiving apparatus comprising:

(1) means for detecting each first and second spaced frequency shift digit, (2) a shift register having a stage for each digit of the cycle and a first stage, (3) first means operatively connecting the first stage of the shift register to the means for detecting a first frequency shift to facilitate storage of said binary inormation in said first stage corresponding to a detected first or second frequency shift, (4) second means operatively connecting the shift register to the detecting means to cancel the information in the first stage and shift the information in the register to each succeeding stage upon the cessation of each detected first or second frequency, (5) a first timing circuit means normally in one condition in response to the detection of each first and second frequency shift digit occurring for a duration and at time intervals corresponding to the duration and spacing of the first predetermined time duration and operated to another condition when the time between the detection of digits is greater than said first predetermined time, (6) means responsive to the operation of the first timing means to its other condition to cancel the information in all the stages of the shift register, (7) a second timing means responsive to the operation of the first timing means to its other condition to render the first stage of the shift register unresponsive to the detection of first and second frequency shift digits for a second predetermined time interval, the time intervals of the first and second timing means in the aggregate corresponding operatively to the time interval between transmitted cycles, and (8) means responsive to the storage of the detected first frequency shift digit in the last stage of the shift register operative to facilitate storage of the complete binary code in parallel form and to render the shift register unresponsive to subsequent detected frequency shift digits received, whereby the receiver is operative to receive a complete cycle of information only when a predetermined number of digits corresponding to the code cycle is received corresponding to the first predetermined time duration and spacing of the transmitter and the first digit of each cycle is of the first frequency shift and each missing or short digit is detected as the completion of one distinct cycle.

9. A receiving apparatus according to claim 8 wherein the detecting means is operative to render the shift register unresponsive to a detected first or second frequency when both said frequencies are detected concurrently.

10. A receiving apparatus according to claim 8 wherein the second means for shifting the information in the shift register is a monostable multivibrator operative to apply a conditioning pulse to the shift register immediately upon the said cessation of each frequency shift digit and a second monostable multivibrator operative upon the cessation of the conditioning pulse to apply a second pulse to the shift register to shift the information from one stage to the next.

11. A receiving apparatus as claimed in claim 8 wherein the first timing means is a monostable multivibrator operative to provide an output in response to a missing or a short pulse to apply a voltage to the shift register to cancel any information stored in its stages.

12. A receiving apparatus according to claim 8 wherein the second timing circuit means is a monostable multivibrator operated in response to the first timing circuit means to inhibit the detection of a frequency shift digit by the shift register.

13. A system for communicating intelligence between transmitting and receiving stations one of which is on a vehicle and the other of which is at a wayside location, said transmitting and receiving stations having respective transmitting and receiving antenna means which pass through an operative coupling relationship as said vehicle passes said wayside location, said transmitting station including (a) code generating means for repeatedly energizing said transmitting antenna means according to a distinctive code of discrete serially-occurring pulses of a predetermined number forming a complete message and having a distinctive end-of-message signal in the interval between successive of said messages, (b) said code generating means energizing said transmitting antenna means according to said code at a sufficiently high rate to ensure that at least one complete message is transmitted from beginning to end throughout the time that said transmitting and receiving antenna means are in said operative coupling relationship even for the maximum expected speed of said vehicle past said wayside location, said receiving station including (1) a storage register for storing the code pulses induced in said receiving antenna means, (2) first means responsive to the storage in said register of a complete message comprising all of said predetermined number of pulses, (3) second means responsive to said first means for removing the code then stored in said register upon the occurrence of said distinctive end-of-message signal unless concurrently a complete message is stored in said register, (4) means controlled by said first means for operatively disconnecting said register from said receiving antenna means when said register stores a complete message, (5) and utilization means coupled to said register and controlled according to a complete message stored therein.

14. The system of claim 13 wherein said code formed by said code generating means is a binary code of spaced digits and said distinctive end-of-message signal is characterized by the absence of transmission of any binary code digit for an interval in excess of the spacing between successive binary digits, said second means including timing means being repeatedly reset by the reception of any binary code digit and completing its timing operation only in the absence of any binary code digit for an interval exceeding the time spacing between successive of said digits.

15. The system of claim 14 wherein said code generating means continually applies an alternating-current signal with a predetermined frequency to said transmitting antenna means and shifts the frequency of said signal to different first and second values on each of the respective binary digits, said code generating means applying said predetermined frequency to said transmitting antenna means throughout the interval between successive messages.

References Cited by the Examiner

UNITED STATES PATENTS

| | | | |
|---|---|---|---|
| 2,731,549 | 1/1956 | Dasburg | 325—111 |
| 2,811,713 | 10/1957 | Spenser | 340—166 |
| 2,947,814 | 8/1960 | Haner | 178—66 |
| 2,995,626 | 8/1961 | Van Duuren | 178—66 |
| 3,145,380 | 8/1964 | Currie | 343—6.5 |
| 3,206,728 | 9/1965 | Baumgart et al. | 340—152 |

NEIL C. READ, *Primary Examiner.*

L. L. HOFFMAN, A. J. KASPER, *Assistant Examiners.*